US012788181B2

(12) United States Patent
Byars et al.

(10) Patent No.: US 12,788,181 B2
(45) Date of Patent: Nov. 10, 2026

(54) GAS GRILLS INCLUDING BUS BARS

(71) Applicant: Weber-Stephen Products LLC, Palatine, IL (US)

(72) Inventors: Megan Byars, Chicago, IL (US); Yinghao Shi, Hoffman Estates, IL (US); Victor Mercado, Jr., Berwyn, IL (US); Jose A. Martinez, Franklin Park, IL (US); Shawn Henry, Elgin, IL (US)

(*) Notice: Subject to any disclaimer, the term of this patent is extended or adjusted under 35 U.S.C. 154(b) by 365 days.

(21) Appl. No.: 18/633,026

(22) Filed: Apr. 11, 2024

(65) Prior Publication Data

US 2025/0318683 A1 Oct. 16, 2025

(51) Int. Cl.
*A47J 37/07* (2006.01)
*F23N 5/24* (2006.01)

(52) U.S. Cl.
CPC .......... *A47J 37/0713* (2013.01); *F23N 5/242* (2013.01); *F23N 2235/18* (2020.01)

(58) Field of Classification Search
CPC ... A47J 37/0713; F23N 5/242; F23N 2235/18
USPC .......................................................... 431/263
See application file for complete search history.

(56) References Cited

U.S. PATENT DOCUMENTS 5,741,129 A * 4/1998 Li .......................... F23Q 3/008 431/264
6,037,571 A 3/2000 Christopher
11,624,508 B2 4/2023 Eckhardt et al.
2003/0140798 A1* 7/2003 Rummel ............. A47J 37/0713 99/419
2009/0250048 A1 10/2009 Educate et al.
2009/0272278 A1 11/2009 von Herrmann et al.
2014/0165849 A1* 6/2014 Mateos Martin ....... F23N 5/242 431/14
2015/0101591 A1* 4/2015 Gulkanat ............. F23D 14/145 126/39 J (Continued)

FOREIGN PATENT DOCUMENTS

WO 2019055145 A1 3/2019
WO 2023038732 A1 3/2023

OTHER PUBLICATIONS

International Searching Authority, "International Search Report and Written Opinion," issued in connection with International Patent Application No. PCT/US2025/010285, mailed on Apr. 23, 2025, 10 pages.

(Continued)

*Primary Examiner* — Avinash A Savani
(74) *Attorney, Agent, or Firm* — Avantech Law, LLP

(57) ABSTRACT

Gas grills including bus bars are disclosed. An example gas grill includes flame sense circuitry, a bus bar, a first burner tube, and a second burner tube. The bus bar is electrically connected to a return line of the flame sense circuitry. The first burner tube is coupled to the bus bar. The first burner tube is electrically connected to the return line via the bus bar. The second burner tube is spaced apart from the first burner tube and coupled to the bus bar. The second burner tube is electrically connected to the return line via the bus bar. The flame sense circuitry is configured to detect a presence of a flame at the first burner tube and a presence of a flame at the second burner tube. The bus bar electrically connects the first burner tube and the second burner tube to the return line in parallel.

20 Claims, 19 Drawing Sheets

(56) References Cited

U.S. PATENT DOCUMENTS

| | | | | |
|---|---|---|---|---|
| 2020/0333013 | A1 * | 10/2020 | Querejeta Andueza | ..................... F23N 1/005 |
| 2023/0258338 | A1 | 8/2023 | Zaprzalka et al. | |

OTHER PUBLICATIONS

Weber, Summit Smart FS38X E Gas Grill, accessed on 2024-04-12 from https://www.weber.com/US/en/gas/summit/summit-smart-fs38x-e-gas-grill-%28liquid-propane%29/1500051.html.

* cited by examiner

SECTION A-A

GAS GRILLS INCLUDING BUS BARS

FIELD OF THE DISCLOSURE

This disclosure relates generally to gas grills and, more specifically, to gas grills including bus bars.

BACKGROUND

Gas grills are commonly equipped with a burner assembly including a manifold, a plurality of burners, and a corresponding plurality of valves, with each valve being operatively positioned between the manifold and a corresponding burner to control a flow of pressurized fluid (e.g., pressurized gas) from the manifold into the valve, and from the valve into the corresponding burner. In some instances, one or more of the burners of a conventional gas grill is/are implemented by a burner tube. In some instances, one or more of the burners of a conventional gas grill is/are additionally or alternatively implemented by an infrared (IR) burner. In some instances, a conventional gas grill equipped with a burner is further equipped with flame sense circuitry and associated hardware configured to detect a presence of a flame at the burner.

Figure 1:
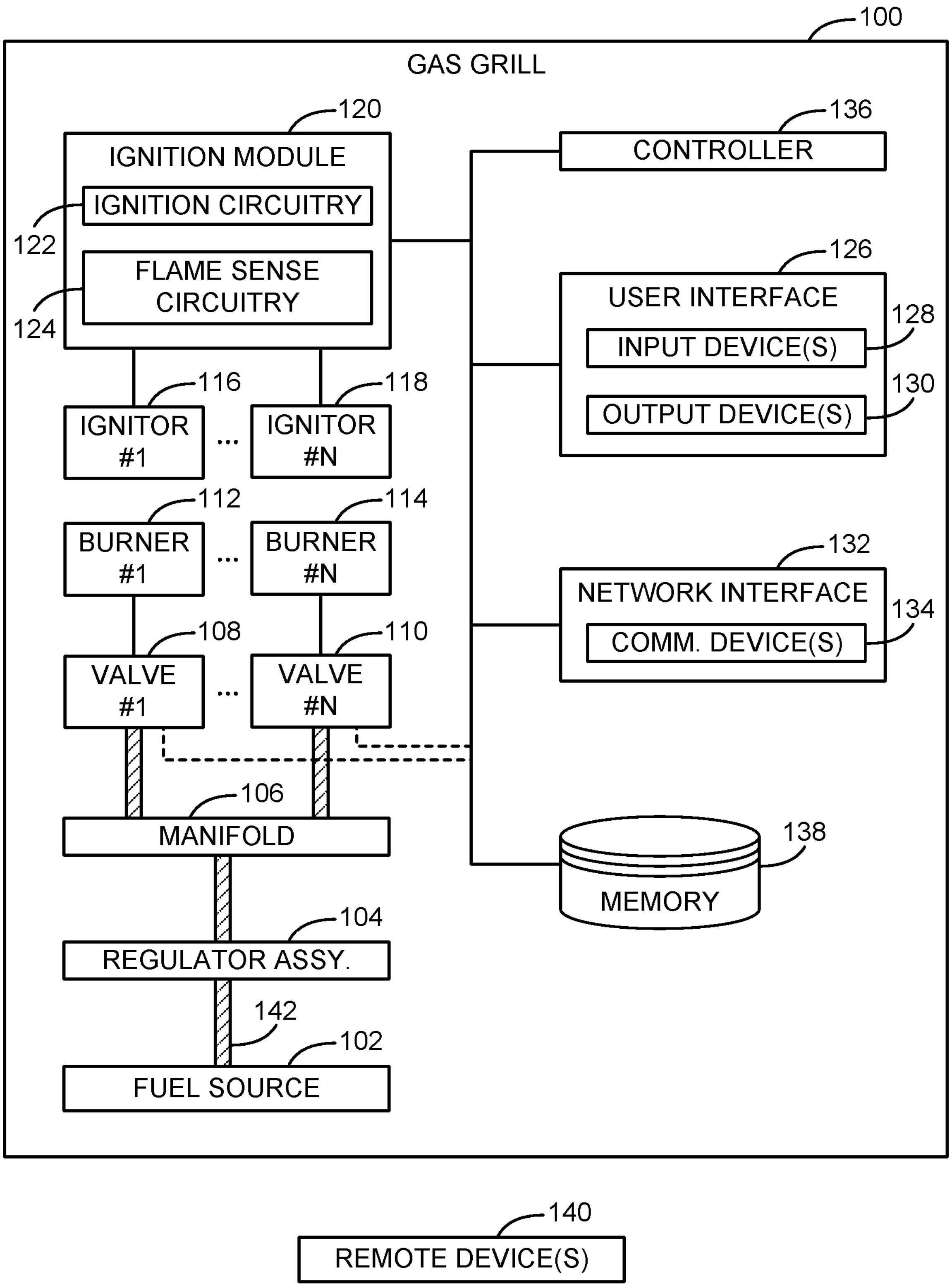
FIG. 1 is a block diagram of an example gas grill constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

As discussed above, gas grills are commonly equipped with a burner assembly including a manifold, a plurality of burners, and a corresponding plurality of valves, with each valve being operatively positioned between the manifold and a corresponding burner to control a flow of pressurized fluid (e.g., pressurized gas) from the manifold into the valve, and from the valve into the corresponding burner. In some instances, a conventional gas grill equipped with a burner is further equipped with flame sense circuitry and associated hardware configured to detect a presence of a flame at the burner. Example flame sense systems configured to detect a presence of a flame at one or more burner(s) (e.g., one or more burner tube(s)) of a gas grill are described in U.S. Pat. No. 11,624,508, the entirety of which is hereby incorporated by reference herein.

In some flame sense systems incorporating multiple burners, each burner must be electrically connected (e.g., directly, or indirectly) to a return line of the flame sense circuitry. To facilitate the aforementioned electrical connections, respective ones of the burners can be daisy chained together such that the respective ones of the burners are electrically connected in series. The daisy chaining approach, however, is not an optimal approach for several reasons. For example, a single break and/or disconnection in any one of the electrical connections between the respective ones of the daisy chained burners can disrupt the flame sense signal for several other ones (e.g., all) of the daisy chained burners, thereby rendering the flame sense system inoperable and/or unusable for its intended purpose. As another example, the number and/or the length of the wires required to form the electrical connections between the respective ones of the daisy chained burners can be cumbersome from a wire routing, wire organization, and/or wire management standpoint.

Example gas grills disclosed herein include flame sense circuitry, a plurality of burners, and a bus bar, wherein the bus bar is configured to electrically connect respective ones of the burners in parallel to a return line of the flame sense circuitry. The parallel electrical connections provided via the bus bar advantageously reduce (e.g., minimize, or eliminate) the above-described drawbacks associated with the daisy chaining approach. For example, an improper electrical connection associated with one of the burners of the gas grills disclosed herein will not disrupt the flame sense signal for any of the other ones of the burners. As another example, the incorporation of a bus bar into the gas grills disclosed herein eliminates any need for most if not all of the wires that would otherwise be required to form the daisy chained electrical connections. The elimination of such wires in favor of the bus bar advantageously simplifies the wire routing, wire organization, and/or wire management associated with implementing a flame sense system including flame sense circuitry and a plurality of burners.

In some disclosed examples, a gas grill includes flame sense circuitry, a bus bar, a first burner tube, and a second burner tube. The bus bar is electrically connected to a return line of the flame sense circuitry. The first burner tube is coupled to the bus bar. The first burner tube is electrically connected to the return line via the bus bar. The flame sense circuitry is configured to detect a presence of a flame at the first burner tube. The second burner tube is spaced apart from the first burner tube and coupled to the bus bar. The second burner tube is electrically connected to the return line via the bus bar. The flame sense circuitry is configured to detect a presence of a flame at the second burner tube. The bus bar electrically connects the first burner tube and the second burner tube to the return line in parallel.

In some disclosed examples, the gas grill further includes a first mounting bracket, a second mounting bracket, a first fastener, and a second fastener. The first mounting bracket extends between the first burner tube and the bus bar. The first fastener engages the first mounting bracket and the bus bar. The first burner tube is coupled to and electrically connected to the bus bar via the first mounting bracket and the first fastener. The second mounting bracket extends between the second burner tube and the bus bar. The second fastener engages the second mounting bracket and the bus bar. The second burner tube is coupled to and electrically connected to the bus bar via the second mounting bracket and the second fastener.

In some disclosed examples, the gas grill further includes ignition circuitry, a first ignitor, and a second ignitor. The first ignitor is electrically connected to the ignition circuitry via a first ignition line. The first ignitor is operatively positioned proximate the first burner tube. The ignition circuitry is configured to cause the first ignitor to generate a spark to ignite a flow of gas passing through the first burner tube. The second ignitor is electrically connected to the ignition circuitry via a second ignition line. The second ignitor is operatively positioned proximate the second burner tube. The ignition circuitry is configured to cause the second ignitor to generate a spark to ignite a flow of gas passing through the second burner tube. In some disclosed examples, the flame sense circuitry is electrically connected to the first ignition line and the second ignition line.

In some disclosed examples, the bus bar includes a clip integrally formed by the bus bar. The clip is configured to receive a portion of at least one of the first ignition line or the second ignition line. In some disclosed examples, the clip projects rearwardly from a rear surface of the bus bar. The clip is advantageously configured to retain the at least one of the first ignition line or the second ignition line adjacent the rear surface of the bus bar.

In some disclosed examples, the bus bar includes a first cutout and a second cutout. The first cutout is formed in and extends through the bus bar. The first burner tube extends through the bus bar via the first cutout such that a front end of the first burner tube is located forward of a front surface of the bus bar. The second cutout is located separately from the first cutout. The second cutout is formed in and extends through the bus bar. The second burner tube extends through the bus bar via the second cutout such that a front end of the second burner tube is located forward of the front surface of the bus bar.

In some disclosed examples, the gas grill further includes a manifold, a first valve, and a second valve. The first valve is operatively positioned between the manifold and the first burner tube. The bus bar is advantageously configured to shield a portion of the first valve located forward of a front surface of the bus bar from heat generated by the first burner tube. The second valve is operatively positioned between the manifold and the second burner tube. The bus bar is advantageously configured to shield a portion of the second valve located forward of the front surface of the bus bar from heat generated by the second burner tube. In some disclosed examples, the first valve and/or the second valve is/are implemented as a controllable electric valve having an electrical component located forward of the front surface of the bus bar. The bus bar is advantageously configured to shield the electrical component of the controllable electric valve from heat generated by the first burner tube and/or the second burner tube. In some disclosed examples, the grill further includes a control panel located forward of a front surface of the bus bar. The bus bar is advantageously configured to shield one or more components carried by the control panel from heat generated by at least one of the first burner tube or the second burner tube.

In some disclosed examples, the gas grill further includes an IR burner spaced apart from the first burner tube and the second burner tube. The IR burner includes one or more ceramic tiles. In some disclosed examples, the return line is a first return line. The IR burner is electrically connected to the bus bar via a second return line extending between the IR burner and the bus bar. The second return line is electrically connected to the first return line via the bus bar. In some disclosed examples, the flame sense circuitry is configured to detect a presence of a flame at the IR burner. In some disclosed examples, an ignitor operatively positioned proximate the IR burner is electrically connected to the ignition circuitry via an ignition line associated with the IR burner. The ignition circuitry is configured to cause the associated ignitor to generate a spark to ignite a flow of gas passing through at least one of the one or more ceramic tiles of the IR burner. In some disclosed examples, the flame sense circuitry is electrically connected to the ignition line associated with the IR burner.

The above-identified features as well as other advantageous features of example gas grills including bus bars are further described below in connection with the figures of the application.

As used herein in a mechanical context, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part. As used herein in an electrical and/or computing context, the term "configured" means arranged, structured, and/or programmed. For example, in the context of processor circuitry configured to perform a specified operation, the processor circuitry is arranged, structured, and/or programmed (e.g., based on machine-readable instructions) to perform the specified operation.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts at the point (or points) of contact between the two parts.

As used herein, the term "fastener" means any device(s), structure(s), and/or material(s) that is/are configured, individually or collectively, to couple, connect, attach, and/or fasten one or more component(s) to one or more other component(s). For example, a fastener can be implemented by any type(s) and/or any number(s) of bolts, nuts, screws, posts, anchors, rivets, pins, clips, ties, welds, adhesives, etc.

As used herein in the context of describing the relationship between two structures, the terms "in fluid communication," "fluidically connected," and/or "fluidically coupled" mean that the two structures are individually and/or collectively configured to allow a fluid (e.g., a gas or a liquid) to pass (e.g., to flow) from the first of the two structures to the second of the two structures, or vice-versa.

As used herein in the context of describing the relationship between two structures, the term "in electrical communication," "electrically connected," and/or "electrically coupled" mean that the two structures are individually and/or collectively configured to allow electrical signals to pass (e.g., to be sent, carried, and/or transmitted) from the first of the two structures to the second if the two structures, or vice-versa. The term "in electrical communication" encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, the term "processor circuitry" is defined to include (i) one or more special purpose electrical circuit(s) structured to perform one or more specific operation(s), and/or (ii) one or more general purpose electrical circuit(s) programmable with instructions to perform one or more specific operation(s). Example processor circuitry described herein can include any type(s) and/or any number(s) of processor(s), microprocessor(s), controller(s), microcontroller(s), application specific integrated circuit(s) (ASIC(s)), programmable logic device(s) (PLD(s)), field programmable logic device(s), (FPLD(s)), field programmable gate arrays (FPGA(s)), digital signal processor(s) (DSP(s)), graphics processing unit(s) (GPU(s)), central processor unit(s) (CPU(s)), semiconductor-based (e.g., silicon-based) circuit(s), digital circuit(s), analog circuit(s), logic circuit(s), and/or integrated circuit(s) implemented via any type(s) and/or any number(s) of transistor(s), capacitor(s), diode(s), inductor(s), resistor(s), timer(s), counter(s), printed circuit board(s), connector(s), wire(s), and/or other electrical circuit component(s).

As used herein, the terms "non-transitory computer-readable medium" and "non-transitory computer-readable storage medium" are expressly defined to include any type of computer-readable storage device and/or storage disk and to exclude propagating signals and to exclude transmission media.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

FIG. 1 is a block diagram of an example gas grill 100 constructed in accordance with the teachings of this disclosure. The gas grill 100 of FIG. 1 includes an example fuel source 102, an example regulator assembly 104, an example manifold 106, a plurality of example valves (e.g., including an example first valve 108 through an example "Nth" valve 110), a plurality of example burners (e.g., including an example first burner 112 through an example "Nth" burner 114), a plurality of example ignitors (e.g., including an example first ignitor 116 through an example "Nth" ignitor 118), an example ignition module 120 (e.g., including example ignition circuitry 122 and example flame sense circuitry 124), an example user interface 126 (e.g., including one or more example input device(s) 128 and one or more example output device(s) 130), an example network interface 132 (e.g., including one or more example communication device(s) 134), an example controller 136, and example memory 138. In other examples, one or more of the aforementioned components of FIG. 1 can be omitted from the gas grill 100. In still other examples, the gas grill 100 can include one or more other component(s) in addition to or in lieu of the aforementioned components of FIG. 1. The gas grill 100 of FIG. 1 is configured to communicate (e.g., wirelessly communicate) with one or more example remote device(s) 140, as further described below.

The fuel source 102 of the gas grill of FIG. 1 is a source of combustible gas. In some examples, the fuel source 102 is implemented as a fuel tank (e.g., a propane tank) containing combustible gas. In such examples, the fuel source 102 will typically be located partially or fully within a cabinet of the gas grill 100, partially or fully within a spatial footprint formed by a frame of the gas grill 100, below a cookbox of the gas grill 100 and partially or fully within a spatial footprint formed by the cookbox, or below a cookbox of the gas grill 100 and partially or fully within a spatial footprint formed by a side table of the gas grill 100. In other examples, the fuel source 102 can instead be implemented as a piped (e.g., household) natural gas line that provides an accessible flow of combustible gas.

The regulator assembly 104 of the gas grill 100 of FIG. 1 is operatively positioned between the fuel source 102 and the manifold 106 of the gas grill 100 such that a supply of pressurized combustible gas provided via the fuel source 102 is regulated by the regulator assembly 104 as the pressurized combustible gas flows from the fuel source 102 through the regulator assembly 104 and into the manifold 106. The manifold 106 of the gas grill 100 of FIG. 1 is operatively positioned between the regulator assembly 104 and respective ones of the valves (e.g., including the first valve 108 through the "Nth" valve 110) of the gas grill 100. The manifold 106 is configured to contain pressurized combustible gas received from the regulator assembly 104 until such pressurized combustible gas can be fed and/or can flow into one or more of the respective ones of the valves (e.g., including the first valve 108 through the "Nth" valve 110) by virtue of a flow control member of the valve being in an open position.

Each one of the valves (e.g., including the first valve 108 through the "Nth" valve 110) of the gas grill 100 of FIG. 1 is operatively positioned between the manifold 106 and a corresponding one of the burners (e.g., including the first burner 112 through the "Nth" burner 114) of the gas grill 100 such that pressurized combustible gas received at the manifold 106 can be selectively supplied to respective ones of the burners via their corresponding valves. In this regard, each one of the valves includes a flow control member (e.g., a cone, a ball, a plug, a gate, a disc, etc.) configured to be movable between a closed position that prevents gas contained within the manifold 106 from flowing toward and/or into the corresponding one of the burners, and an open position that enables gas contained within the manifold 106 to flow toward and/or into the corresponding one of the burners.

In some examples, one or more of the valves (e.g., including the first valve 108 through the "Nth" valve 110) of the gas grill 100 of FIG. 1 is/are implemented as a controllable electric valve (e.g., a solenoid valve). In such examples, the flow control member of each such controllable electric valve is configured to transition from the closed position to the open position, and vice-versa, in response to instructions, commands, and/or signals (e.g., a supply of current) generated by the controller 136 of the gas grill 100 of FIG. 1. Accordingly, in such examples, each such controllable electric valve is operatively coupled to (e.g., in electrical communication with) the controller 136 of the gas grill 100. In such examples, the controller 136 may generate one or more instruction(s), command(s), and/or signal(s) associated with movement of one or more of the flow control members of such controllable electric valves in response to one or more user input(s), instruction(s), command(s), and/or signal(s) received via the user interface 126 and/or the network interface 132 of the gas grill 100 of FIG. 1.

In other examples, one or more of the valves (e.g., including the first valve 108 through the "Nth" valve 110) of the gas grill 100 of FIG. 1 is/are implemented as a manually-controlled valve. In such other examples, each such manually-controlled valve may include a stem that is mechanically coupled to the flow control member of the manually-controlled valve such that movement (e.g., rotation) of the stem causes a corresponding movement (e.g., rotation) of the flow control member between the closed position and the open position. In such other examples, movement (e.g., rotation) of the stem may be facilitated via user interaction with a control knob that is mechanically coupled to the stem.

Each one of the burners (e.g., including the first burner 112 through the "Nth" burner 114) of the gas grill 100 of FIG. 1 can be implemented as any type of burner including, for example, as a burner tube or as an IR burner. In some examples, one or more of the burners is/are implemented as a burner tube (e.g., a linear burner tube), with the burner tube having a gas inlet and a plurality of ports. In such examples, the gas inlet of the burner tube receives a flow of gas from a corresponding one of the valves of the gas grill 100, with such received gas thereafter being emitted from the burner tube via respective ones of the ports of the burner tube. In some examples, one or more of the burners is/are implemented as an IR burner (e.g., a downwardly facing IR burner), with the IR burner including a combustion chamber and one or more ceramic tile(s) that partially bound the combustion chamber. In such examples, a gas inlet of the combustion chamber receives a flow of gas from a corresponding one of the valves of the gas grill 100, with such received gas thereafter being emitted from the combustion chamber via apertures formed in respective ones of the ceramic tiles of the IR burner.

In some examples, each one of the burners (e.g., including the first burner 112 through the "Nth" burner 114) of the gas grill 100 of FIG. 1 is implemented as a burner tube. In other examples, each one of the burners of the gas grill 100 is implemented as an IR burner. In still other examples, at least one of the burners of the gas grill 100 is implemented as a burner tube, and at least another one of the burners of the gas grill 100 is implemented as an IR burner. In still other examples one or more of the burners of the gas grill 100 can be implemented by another type of burner (e.g., other than a burner tube or an IR burner). The burners of the gas grill 100 can accordingly be implemented by various types and/or various combinations of burners aside from the types and/or the combinations expressly described above and/or further described herein.

The gas grill 100 of FIG. 1 further includes an example gas train 142 that extends from the fuel source 102 to the regulator assembly 104, from the regulator assembly 104 to the manifold 106, from the manifold 106 to respective ones of the valves (e.g., including the first valve 108 through the "Nth" valve 110), and from the respective ones of the valves to corresponding ones of the burners (e.g., including the first burner 112 through the "Nth" burner 114). The gas train 142 of FIG. 1 can be implemented via one or more conduit(s) (e.g., one or more rigid or flexible pipe(s), tube(s), etc.) that are configured to carry and/or otherwise contain pressurized combustible gas. In the illustrated example of FIG. 1, the gas train 142 is configured such that the regulator assembly 104 is in fluid communication with and located downstream from the fuel source 102, the manifold 106 is in fluid communication with and located downstream from the regulator assembly 104, the respective ones of the valves (e.g., including the first valve 108 through the "Nth" valve 110) are in fluid communication with and located downstream from the manifold 106, and the corresponding ones of the burners (e.g., including the first burner 112 through the "Nth" burner 114) are in fluid communication with and located downstream from the respective ones of the valves.

Each one of the ignitors (e.g., including the first ignitor 116 through the "Nth" ignitor 118) of the gas grill 100 of FIG. 1 is operatively positioned relative to a corresponding one of the burners (e.g., including the first burner 112 through the "Nth" burner 114) of the gas grill 100. More specifically, each one of the ignitors is located proximate (e.g., adjacent) a corresponding one of the burners at a position that enables the ignitor (e.g., via a spark electrode of the ignitor) to ignite combustible gas as the combustible gas emanates from ports (e.g., ports formed in a burner tube) or apertures (e.g., apertures formed in a ceramic tile of an IR burner) of the corresponding burner. In the illustrated example of FIG. 1, each one of the ignitors is operatively coupled to (e.g., in electrical communication with) the ignition circuitry 122 and/or the flame sense circuitry 124 of the gas grill 100, with each such ignitor being configured to generate sparks (e.g., via a spark electrode of the ignitor) and/or to otherwise induce ignition of the combustible gas emanating from the ports or apertures of the corresponding burner in response to an instruction, a command, and/or a signal (e.g., an ignition activation instruction, command, and/or signal) generated by the controller 136 of the gas grill 100.

The ignition module 120 of the gas grill of FIG. 1 is a self-contained unit including one or more electrical component(s). In the illustrated example of FIG. 1, the ignition module includes the ignition circuitry 122 and the flame sense circuitry 124. In other examples, the ignition circuitry 122 and the flame sense circuitry 124 can instead be packaged and/or incorporated into separate modules (e.g., an ignition module and a flame sense module). In some examples, the ignition module 120 further includes one or more controller(s) and/or one or more memory component(s).

The ignition circuitry 122 of the gas grill of FIG. 1 is configured to implement (e.g., under the control and/or management of the controller 136 of FIG. 1) one or more operation(s) associated with the ignitors (e.g., including the first ignitor 116 through the "Nth" ignitor 118) of the gas grill 100. For example, in association with one or more instruction(s), command(s), and/or signal(s) received from and/or one or more operation(s) performed by the controller 136 of FIG. 1, the ignition circuitry 122 can activate respective ones of the ignitors (e.g., including the first ignitor 116 through the "Nth" ignitor 118) of the gas grill 100 such that each one of such activated ignitors generates one or more sparks (e.g., via a spark electrode of the activated ignitor), thereby causing each one of such activated ignitors to ignite a corresponding one of the burners (e.g., including the first burner 112 through the "Nth" burner 114) of the gas grill 100.

The flame sense circuitry 124 of the gas grill of FIG. 1 is configured to implement (e.g., under the control and/or management of the controller 136 of FIG. 1) one or more operation(s) associated with detecting a presence of a flame at respective ones of the burners (e.g., including the first burner 112 through the "Nth" burner 114) of the gas grill 100. For example, in association with one or more instruction(s), command(s), and/or signal(s) received from and/or one or more operation(s) performed by the controller 136 of FIG. 1, the flame sense circuitry 124 can detect and/or determine whether a flame is present at one or more of the burners (e.g., including the first burner 112 through the "Nth" burner 114) of the gas grill 100. As further described herein, the flame sense circuitry 124 includes and/or is electrically connected to a return line (e.g., a grounded return line), with the return line being electrically connected to each one of the burners of the gas grill 100 such that the return line can be utilized in connection with detecting and/or determining a presence of a flame at one or more of the burners. In some examples, the flame sense circuitry 124 detects the presence of a flame at a specific one of the burners by emitting a voltage across a corresponding one of the ignitors and the return line of the flame sense circuitry 124, and then measuring the amount of current passing from the corresponding one of the ignitors and the return line. In other examples, the flame sense circuitry 124 detects the presence of a flame at a specific one of the burners by measuring the voltage across a corresponding specific one of the ignitors and the return line. These and other example implementations of the flame sense circuitry 124 of the gas grill of FIG. 1 are further described in U.S. Pat. No. 11,624,508, the entirety of which is hereby incorporated by reference herein.

The user interface 126 of the gas grill 100 of FIG. 1 enables a user of the gas grill 100 to interact with the controller 136 of the gas grill 100. In the illustrated example of FIG. 1, the user interface 126 is operatively coupled to (e.g., in electrical communication with) the controller 136 and/or the memory 138 of the gas grill 100. In some examples, the user interface 126 is mechanically coupled to (e.g., fixedly connected to) the gas grill 100. For example, the user interface 126 can be mounted to a cookbox, a lid, a frame, or a side table of the gas grill 100. The user interface 126 is preferably mounted to a portion of the gas grill 100 that is readily accessible to a user of the gas grill 100, such as a front portion of a cookbox, a front portion of a lid, a front portion of a frame, or a front portion of a side table of the gas grill 100. In some examples, respective ones of the input device(s) 128 and/or the output device(s) 130 of the user interface 126 can be mounted to different portions of the gas grill 100. The architecture and/or operations of the user interface 126 can be distributed among any number of user interfaces respectively having any number of input device(s) 128 and/or output device(s) 130 located at and/or mounted to any portion of the gas grill 100.

The input device(s) 128 of the user interface 126 of FIG. 1 permit(s) the user of the gas grill 100 to enter data, information, selections, inputs, instructions, and/or commands into the controller 136. For example, the input device(s) 128 of the user interface 126 can permit the user of the gas grill 100 to enter data, information, one or more selection(s), one or more input(s), one or more instruction(s), and/or one or more command(s) into the controller 136 that cause(s) the controller 136 to implement (e.g., to initiate, to execute, and/or to terminate) one or more flame sensing process(es) (e.g., one or more process(es) and/or protocol(s) configured to detect a presence of a flame at a burner of the gas grill 100 of FIG. 1) via the gas grill 100. The input device(s) 128 of the user interface 126 can be implemented, for example, by one or more of a touchscreen, a button, a dial, a knob, a switch, an audio sensor, a microphone, an image sensor, a camera, and/or a voice recognition system.

The output device(s) 130 of the user interface 126 of FIG. 1 facilitate(s) the presentation of data and/or information (e.g., data and/or information generated by the controller 136) to the user of the gas grill 100. For example, the output device(s) 130 of the user interface 126 can facilitate the presentation (e.g., textually, graphically, and/or audibly) of data and/or information (e.g., one or more notification(s), alert(s), and/or message(s)) associated with implementing (e.g., initiating, executing, and/or terminating) one or more flame sensing process(es) (e.g., one or more process(es) and/or protocol(s) configured to detect a presence of a flame at a burner of the gas grill 100 of FIG. 1) via the gas grill 100. The output device(s) 130 of the user interface 126 can be implemented, for example, by one or more of a display device (e.g., a light emitting diode (LED), an organic light emitting diode (OLED), a liquid crystal display (LCD), a cathode ray tube (CRT) display, an in-plane switching (IPS) display, a touchscreen, etc.), a tactile output device, and/or a speaker.

The network interface 132 of the gas grill 100 of FIG. 1 enables a user of the gas grill 100 to remotely interact (e.g., via one or more of the remote device(s) 140) with the gas grill 100. In the illustrated example of FIG. 1, the network interface 132 is operatively coupled to (e.g., in electrical communication with) the controller 136 and/or the memory 138 of the gas grill 100. The network interface 132 of FIG. 1 includes one or more communication device(s) 134 (e.g., transmitter(s), receiver(s), transceiver(s), modem(s), gateway(s), wireless access point(s), etc.) to facilitate the exchange of data with external machines (e.g., computing devices of any kind, including the remote device(s) 140 of FIG. 1) by a wired or wireless communication network. Communications transmitted and/or received via the communication device(s) 134 and/or, more generally, via the network interface 132 can be made over and/or carried by, for example, an Ethernet connection, a digital subscriber line (DSL) connection, a telephone line connection, a coaxial cable system, a satellite system, a wireless system, a cellular telephone system, an optical connection, etc.

The controller 136 of the gas grill 100 of FIG. 1 implements processor circuitry to control and/or manage one or more operation(s) associated with the gas grill 100 of FIG. 1 and/or the components thereof, including the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the memory 138. The processor circuitry of the controller 136 of FIG. 1 includes any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s).

In the illustrated example of FIG. 1, the controller 136 is graphically represented as a single, discrete structure that manages and/or controls the operation(s) of various components of the gas grill 100. It is to be understood, however, that in other examples, the architecture and/or operations of the controller 136 can be distributed among any number of controllers, with each separate controller having a dedicated subset of one or more operation(s) described herein. In some examples, the gas grill 100 can include separate, distinct controllers for one or more of the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the memory 138 of the gas grill 100.

In the illustrated example of FIG. 1, the controller 136 is operatively coupled to (e.g., in electrical communication with) one or more of the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the memory 138 of the gas grill 100. The controller 136 of FIG. 1 is also operatively coupled to (e.g., in wired or wireless electrical communication with) the remote device(s) 140 of FIG. 1 via the network interface 132 (e.g., including the communication device(s) 134) of the gas grill 100 of FIG. 1. In some examples, the controller 136 of FIG. 1 receives commands, instructions, signals, and/or data from, and/or transmits commands, instructions, signals, and/or data to, the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the memory 138 of the gas grill 100 in connection with implementing (e.g., initiating, executing, and/or terminating) one or more flame sensing protocol(s), process(es), program(s), sequence(s), subroutine(s), and/or method(s), as further described herein.

In some examples, the controller 136 of FIG. 1 manages and/or controls one or more operation(s) associated with the gas grill 100 based on instructions, commands, and/or signals transmitted from the controller 136 to one or more component(s) of the gas grill 100 that is/are operatively coupled to (e.g., in wired or wireless electrical communication with) the controller 136. For example, when one or more of the valves (e.g., including the first valve 108 through the "Nth" valve 110) of FIG. 1 is/are implemented as a controllable electric valve (e.g., a solenoid valve), the controller 136 of FIG. 1 can instruct, command, signal, and/or otherwise cause respective ones of such controllable electric valves of the gas grill 100 to open (e.g., fully open), to close (e.g., fully close), or to otherwise change position. As another example, the controller 136 of FIG. 1 can instruct, command, signal, and/or otherwise cause the ignition circuitry 122 of the gas grill 100 to activate respective ones of the ignitors (e.g., including the first ignitor 116 through the "Nth" ignitor 118) of the gas grill 100 such that each one of such activated ignitors generates one or more sparks, thereby causing each one of such activated ignitors to ignite a corresponding one of the burners (e.g., including the first burner 112 through the "Nth" burner 114) of the gas grill 100. As another example, the controller 136 of FIG. 1 can instruct, command, signal, and/or otherwise cause one or more of the output device(s) 130 of the user interface 126 of the gas grill 100 to textually, graphically, or audibly present data and/or information, which may include one or more notification(s) (e.g., one or more visible, audible, and/or tactile message(s) or alert(s)). As another example, the controller 136 of FIG. 1 can instruct, command, signal, and/or otherwise cause one or more of the communication device(s) 134 of the network interface 132 of the gas grill 100 to transmit data and/or information, which may include one or more notification(s) (e.g., one or more visible, audible, and/or tactile message(s) or alert(s)), to one or more of the remote device(s) 140 of FIG. 1.

In some examples, the controller 136 of FIG. 1 detects and/or determines one or more state(s), condition(s), operation(s), and/or event(s) associated with the gas grill 100 based on data, information, and/or signals received from one or more component(s) of the gas grill 100 that is/are operatively coupled to (e.g., in wired or wireless electrical communication with) the controller 136 of the gas grill 100. For example, when one or more of the valves (e.g., including the first valve 108 through the "Nth" valve 110) of FIG. 1 is/are implemented as a controllable electric valve (e.g., a solenoid valve), the controller 136 of FIG. 1 can detect and/or determine a relative position of each such controllable electric valve of the gas grill 100 based on one or more instruction(s), command(s), and/or signal(s) generated at the controller 136 and/or transmitted to the controllable electric valve. As another example, the controller 136 of FIG. 1 can detect and/or determine an activation status of each ignitor (e.g., including the first ignitor 116 through the "Nth" ignitor 118) of the gas grill 100 (e.g., whether the ignitor has been activated) based on one or more ignition activation instruction(s), command(s), and/or signal(s) generated at the controller 136 and/or transmitted to the ignitor. As another example, the controller 136 of FIG. 1 can detect and/or determine whether a flame is present at one or more of the burners (e.g., including the first burner 112 through the "Nth" burner 114) of the gas grill 100 based on data, information, and/or signals received at, processed by, generated by, and/or transmitted from the flame sense circuitry 124 of FIG. 1. As another example, the controller 136 of FIG. 1 can detect and/or determine one or more state(s), condition(s), operation(s), and/or event(s) associated with the gas grill 100 based on data, information, and/or signals received from the user interface 126 of the gas grill 100. As another example, the controller 136 of FIG. 1 can detect and/or determine one or more state(s), condition(s), operation(s), and/or event(s) associated with the gas grill 100 based on data, information, and/or signals received from the network interface 132 of the gas grill 100.

The memory 138 of the gas grill 100 of FIG. 1 can be implemented by any type(s) and/or any number(s) of storage device(s) such as an optical storage device, a magnetic storage device, a floppy disk drive, a hard disk drive (HDD), a solid state storage device, a flash memory, a read-only memory (ROM), a random-access memory (RAM), a volatile memory, a non-volatile memory, a cache, a CD, a DVD, a Blu-ray disk, and/or any other tangible storage device or tangible storage disk in which information is stored for any duration (e.g., permanently, for extended time periods, for brief instances, for temporarily buffering, and/or for caching of the information). The information and/or data stored in the memory 138 of FIG. 1 can be stored in any file and/or data structure format, organization scheme, and/or arrangement. The memory 138 of FIG. 1 is accessible to one or more of the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the controller 136 of the gas grill 100 of FIG. 1.

The memory 138 of the gas grill 100 of FIG. 1 stores data sensed, measured, detected, generated, determined, computed, calculated, identified, presented, input, output, transmitted, and/or received by, to, and/or from the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), and/or the controller 136 of the gas grill 100. The memory 138 also stores instructions (e.g., computer-readable instructions) and associated data corresponding to one or more flame sensing protocol(s), process(es), program(s), sequence(s), subroutine(s), and/or method(s) described herein. The memory 138 can also store correlation data, threshold data, and/or settings data associated with such flame sensing protocol(s), process(es), program(s), sequence(s), subroutine(s), and/or method(s).

The remote device(s) 140 of FIG. 1 can be implemented by any type(s) and/or any number(s) of mobile or stationary computing devices. In this regard, examples of such remote device(s) 140 include a smartphone, a tablet, a laptop, a desktop, a cloud server, a wearable computing device, a wireless control hub, etc. The remote device(s) 140 of FIG. 1 facilitate(s) a remote (e.g., wired, or wireless) extension of the above-described user interface 126 of the gas grill 100. In this regard, each remote device 140 includes one or more input device(s) and/or one or more output device(s) that mimic and/or enable a remotely-located version of the above-described functionality of the corresponding input device(s) 128 and/or the corresponding output device(s) 130 of the user interface 126 of the gas grill 100. Accordingly, one or more input(s), selection(s), instruction(s), and/or command(s) received at the gas grill 100 (e.g., via the communication device(s) 134 of the network interface 132 of the gas grill 100) from the remote device(s) 1401 can be entered and/or made via the input device(s) of the remote device(s) 140 much in the same way that such input(s), selection(s), instruction(s), and/or command(s) would be entered and/or made via the input device(s) 128 of the user interface 126 of the gas grill 100. Similarly, one or more notification(s), prompt(s), request(s), and/or confirmation(s) transmitted from the gas grill 100 (e.g., via the communication device(s) 134 of the network interface 132 of the gas grill 100) to the remote device(s) 140 can be presented via the output device(s) of the remote device(s) 140 much in the same way that such notification(s), prompt(s), request(s), and/or confirmation(s) would be presented via the output device(s) 130 of the user interface 126 of the gas grill 100.

While an example manner of implementing the gas grill 100 is illustrated in FIG. 1, one or more of the elements, processes, and/or devices illustrated in FIG. 1 may be combined, divided, re-arranged, omitted, eliminated, and/or implemented in any other way. Further, the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), the controller 136, the memory 138, and/or, more generally, the gas grill 100 of FIG. 1, may be implemented by hardware alone or by hardware in combination with software and/or firmware. Thus, for example, any of the valves (e.g., including the first valve 108 through the "Nth" valve 110), the ignitors (e.g., including the first ignitor 116 through the "Nth" ignitor 118), the ignition module 120 (e.g., including the ignition circuitry 122 and the flame sense circuitry 124), the user interface 126 (e.g., including the input device(s) 128 and the output device(s) 130), the network interface 132 (e.g., including the communication device(s) 134), the controller 136, the memory 138, and/or, more generally, the gas grill 100 of FIG. 1 could be implemented at least in part by processor circuitry including any type(s) and/or any number(s) of processor(s), microprocessor(s), controller(s), microcontroller(s), ASIC(s), PLD(s), FPLD(s), FPGA(s), DSP(s), GPU(s), CPU(s), semiconductor-based (e.g., silicon-based) circuit(s), digital circuit(s), analog circuit(s), logic circuit(s), and/or integrated circuit(s) implemented by any type(s) and/or any number(s) of transistor(s), capacitor(s), diode(s), inductor(s), resistor(s), timer(s), counter(s), printed circuit board(s), connector(s), wire(s), and/or other electrical circuit component(s).

Figure 2:
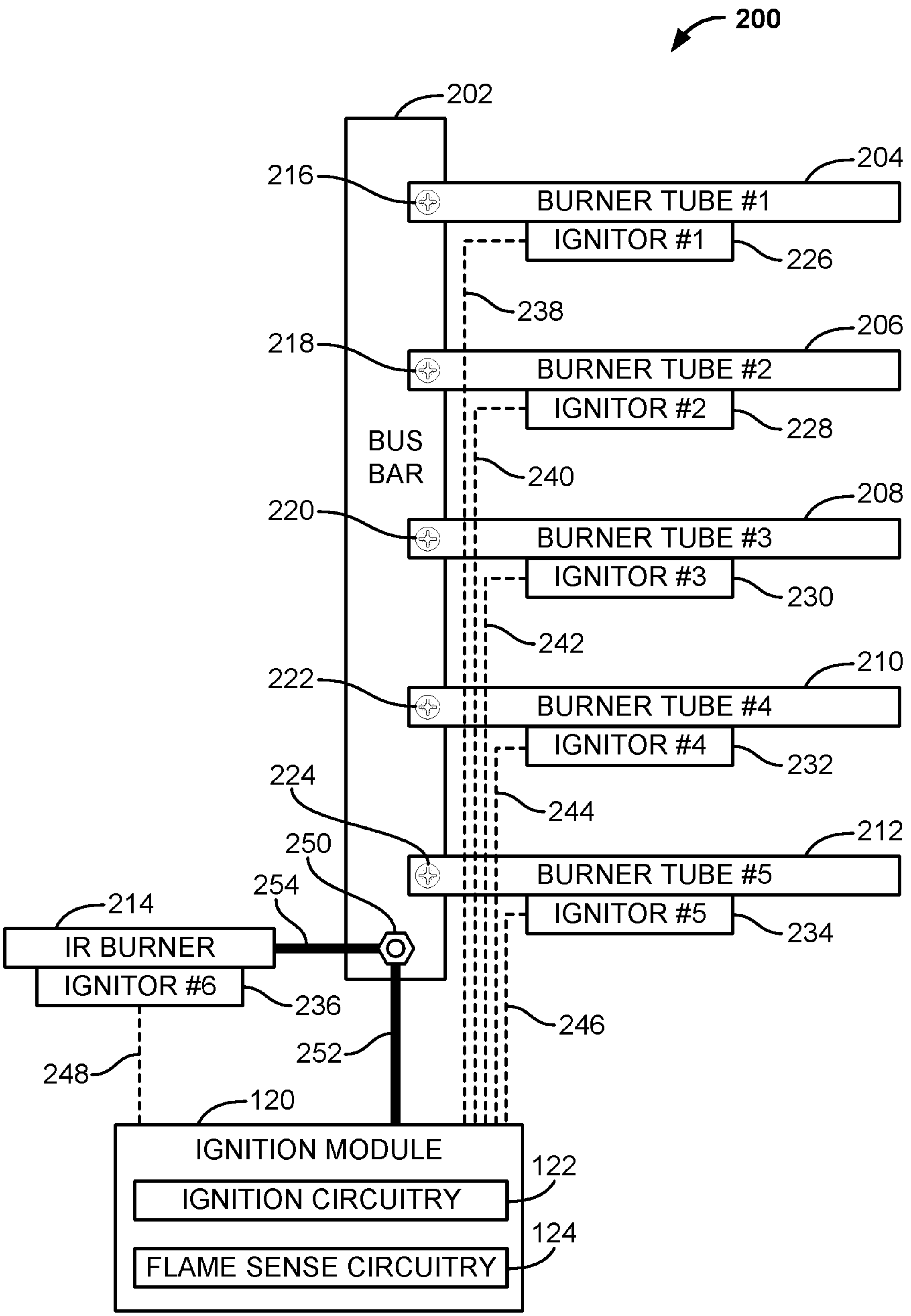
FIG. 2 is a block diagram of an example flame sense system configured to be implemented by the gas grill of FIG. 1.

FIG. 2 is a block diagram of an example flame sense system 200 configured to be implemented by the gas grill 100 of FIG. 1. In the illustrated example of FIG. 2, the flame sense system 200 includes the ignition module 120 (e.g., including the ignition circuitry 122 and the flame sense circuitry 124) of FIG. 1 described above, and further includes an example bus bar 202, six example burners (e.g., including an example first burner tube 204, an example second burner tube 206, an example third burner tube 208, an example fourth burner tube 210, and an example fifth burner tube 212, and an example IR burner 214), five example burner tube fasteners (e.g., including an example first burner tube fastener 216, an example second burner tube fastener 218, an example third burner tube fastener 220, an example fourth burner tube fastener 222, and an example fifth burner tube fastener 224), six example ignitors (e.g., including an example first ignitor 226, an example second ignitor 228, an example third ignitor 230, an example fourth ignitor 232, an example fifth ignitor 234, and an example sixth ignitor 236), six example ignition lines (e.g., including an example first ignition line 238, an example second ignition line 240, an example third ignition line 242, an example fourth ignition line 244, an example fifth ignition line 246, and an example sixth ignition line 248), an example return line fastener 250, an example first return line 252, and an example second return line 254. The flame sense system 200 can further include one or more additional component(s) not expressly shown in FIG. 2, including one or more controller(s) (e.g., the controller 136 of FIG. 1) and/or one or more memory component(s) (e.g., the memory 138 of FIG. 1). The flame sense system 200 of FIG. 2 is representative of a six-burner implementation of the gas grill 100 in which five of the six burners are implemented as burner tubes, and the remaining one of the six burners is implemented as an IR burner. As discussed above in connection with FIG. 1, the gas grill 100 can be implemented with many other number(s), type(s), and/or combination(s) of burners. The representative flame sense system 200 shown in FIG. 2 can be scaled up or scaled down accordingly to accommodate the implemented number, the implemented type, and/or the implemented combination of burners of the gas grill 100.

The bus bar 202 of the flame sense system 200 of FIG. 2 is implemented by a conductive material and, more preferably, by a conductive metal. In some examples, the bus bar 202 is formed from sheet metal. In some examples, the bus bar 202 is formed from stainless steel sheet metal. The bus bar 202 is configured to provide an electrical pathway between the first return line 252 of FIG. 2 and respective ones of the burner tubes (e.g., the first burner tube 204, the second burner tube 206, the third burner tube 208, the fourth burner tube 210, and the fifth burner tube 212) of FIG. 2 such that each one of the burner tubes is electrically connected to the first return line 252 in parallel via the bus bar 202. In some examples, the bus bar 202 is electrically grounded. An example physical implementation of the bus bar 202 of FIG. 2 is further described below in connection with FIGS. 3-8.

Each one of the burner tubes (e.g., the first burner tube 204, the second burner tube 206, the third burner tube 208, the fourth burner tube 210, and the fifth burner tube 212) of FIG. 2 is implemented by a conductive material and, more preferably, by a conductive metal. As shown in FIG. 2, the respective ones of the burner tubes are spaced apart from one another along the bus bar 202 with each one of the burner tubes being mechanically coupled to the bus bar 202 at a distinct and/or unique location. In some examples, the respective ones of the burner tubes are oriented parallel to one another (e.g., laterally spaced apart, with each burner tube extending in a front-to-rear direction within a cookbox of the gas grill 100). In some examples, each one of the burner tubes of FIG. 2 is configured as a linear burner tube having a first end (e.g., a front end), a second end (e.g., a rear end) located opposite the first end, and a plurality of ports located between the first end and the second end. In such examples, the first end of each burner tube includes an opening configured as a gas inlet. In such examples, the gas inlet of each burner tube can receive a flow of gas from a corresponding one of the valves of the gas grill 100, with such received gas thereafter being emitted from the burner tube via respective ones of the ports of the burner tube.

The IR burner 214 of FIG. 2 is spaced apart from (e.g., located above) respective ones of the burner tubes of FIG. 2. The IR burner 214 includes a combustion chamber and one or more ceramic tile(s) that partially bound the combustion chamber. The IR burner 214 is configured such that a gas inlet of the combustion chamber receives a flow of gas from a corresponding one of the valves of the gas grill 100, with such received gas thereafter being emitted from the combustion chamber via apertures formed in respective ones of the ceramic tiles of the IR burner 214. In some examples, the IR burner 214 of FIG. 2 is implemented as a downwardly-facing IR burner wherein the IR burner 214 is located above respective ones of the burner tubes of the gas grill 100, and wherein the ceramic tile(s) of the IR burner 214 is/are oriented downwardly toward the burner tubes. The IR burner 214 of FIG. 2 is electrically connected to the bus bar 202, to the return line fastener 250, and/or to the first return line 252 of FIG. 2 via the second return line 254, as further described herein.

In the illustrated example of FIG. 2, each one of the burner tubes (e.g., the first burner tube 204, the second burner tube 206, the third burner tube 208, the fourth burner tube 210, and the fifth burner tube 212) is mechanically coupled to the bus bar 202 via a corresponding one of the burner tube fasteners (e.g., the first burner tube fastener 216, the second burner tube fastener 218, the third burner tube fastener 220, the fourth burner tube fastener 222, and the fifth burner tube fastener 224). For example, as shown in FIG. 2, the first burner tube 204 is mechanically coupled to the bus bar 202 via the first burner tube fastener 216, the second burner tube 206 is mechanically coupled to the bus bar 202 via the second burner tube fastener 218, the third burner tube 208 is mechanically coupled to the bus bar 202 via the third burner tube fastener 220, the fourth burner tube 210 is mechanically coupled to the bus bar 202 via the fourth burner tube fastener 222, and the fifth burner tube 212 is mechanically coupled to the bus bar 202 via the fifth burner tube fastener 224. In some examples, each one of the burner tube fasteners of FIG. 2 is implemented as a machine screw.

In some examples, each one of the burner tube fasteners of FIG. 2 directly couples the corresponding one of the burner tubes to the bus bar 202 (e.g., the first burner tube fastener 216 directly couples the first burner tube 204 to the bus bar 202, the second burner tube fastener 218 directly coupled the second burner tube 206 to the bus bar 202, etc.). In other examples, respective ones of a plurality of mounting brackets (e.g., first, second, third, fourth, and fifth mounting brackets) extend between corresponding ones of the burner tubes and the bus bar 202 (e.g., a first mounting bracket extends between the first burner tube 204 and the bus bar 202, a second mounting bracket extends between the second burner tube 206 and the bus bar 202, etc.).

In such other examples, the corresponding ones of the mounting brackets are directly coupled (e.g., via one or more fastener(s)) to corresponding ones of the burner tubes (e.g., the first mounting bracket is directly coupled to the first burner tube 204, the second mounting bracket is directly coupled to the second burner tube 206, etc.). In such other examples, respective ones of the burner tube fasteners directly couple the corresponding ones of the mounting brackets to the bus bar 202 (e.g., the first burner tube fastener 216 directly couples the first mounting bracket to the bus bar 202, the second burner tube fastener 218 directly couples the second mounting bracket to the bus bar 202, etc.). Respective ones of the burner tubes are accordingly mechanically coupled to the bus bar 202 via corresponding ones of the mounting brackets and/or corresponding ones of the burner tube fasteners (e.g., the first burner tube 204 is mechanically coupled to the bus bar 202 via the first mounting bracket and/or the first burner tube fastener 216, the second burner tube 206 is mechanically coupled to the bus bar 202 via the second mounting bracket and/or the second burner tube fastener 218, etc.).

Each one of the burner tube fasteners (e.g., the first burner tube fastener 216, the second burner tube fastener 218, the third burner tube fastener 220, the fourth burner tube fastener 222, and the fifth burner tube fastener 224) of FIG. 2 is implemented by a conductive material and, more preferably, by a conductive metal. Thus, in addition to being mechanically coupled to the bus bar 202, each one of the burner tubes (e.g., the first burner tube 204, the second burner tube 206, the third burner tube 208, the fourth burner tube 210, and the fifth burner tube 212) is electrically connected to the bus bar 202 via a corresponding one of the burner tube fasteners. For example, as shown in FIG. 2, the first burner tube 204 is electrically connected to the bus bar 202 via the first burner tube fastener 216, the second burner tube 206 is electrically connected to the bus bar 202 via the second burner tube fastener 218, the third burner tube 208 is electrically connected to the bus bar 202 via the third burner tube fastener 220, the fourth burner tube 210 is electrically connected to the bus bar 202 via the fourth burner tube fastener 222, and the fifth burner tube 212 is electrically connected to the bus bar 202 via the fifth burner tube fastener 224.

As discussed above, in some examples, respective ones of a plurality of mounting brackets (e.g., first, second, third, fourth, and fifth mounting brackets) extend between corresponding ones of the burner tubes and the bus bar 202 (e.g., a first mounting bracket extends between the first burner tube 204 and the bus bar 202, a second mounting bracket extends between the second burner tube 206 and the bus bar 202, etc.), with the corresponding ones of the mounting brackets being directly coupled (e.g., via one or more fastener(s)) to corresponding ones of the burner tubes, and with respective ones of the burner tube fasteners directly coupling the corresponding ones of the mounting brackets to the bus bar 202. In such examples, each one of the mounting brackets is implemented by a conductive material and, more preferably, by a conductive metal such that the mounting bracket forms part of an electrical pathway extending from the corresponding one of the burner tubes to the corresponding one of the mounting brackets, and from the corresponding one of the mounting brackets to the corresponding one of the burner tube fasteners and/or to the bus bar 202. For example, a first electrical pathway extends from the first burner tube 204 to a first mounting bracket, and from the first mounting bracket to the first burner tube fastener 216 and/or to the bus bar 202. In such an example, the first burner tube 204 is accordingly electrically connected to the bus bar 202 via the first mounting bracket and/or via the first burner tube fastener 216. As another example, a second electrical pathway (e.g., parallel to the first electrical pathway) extends from the second burner tube 206 to a second mounting bracket, and from the second mounting bracket to the second burner tube fastener 218 and/or to the bus bar 202. In such an example, the second burner tube 206 is accordingly electrically connected to the bus bar 202 (e.g., in parallel relative to the first burner tube 204) via the second mounting bracket and/or via the second burner tube fastener 218.

Each one of the ignitors (e.g., the first ignitor 226, the second ignitor 228, the third ignitor 230, the fourth ignitor 232, the fifth ignitor 234, and the sixth ignitor 236) of FIG. 2 is operatively positioned proximate (e.g., adjacent to) a corresponding one of the burners (e.g., the first burner tube 204, the second burner tube 206, the third burner tube 208, the fourth burner tube 210, the fifth burner tube 212, and the IR burner 214) of FIG. 2 such that a spark generated by and/or at a spark electrode of the ignitor can ignite a flow of gas passing through and/or emanating from the burner (e.g., through the ports of the respective burner tube, or through the apertures of the ceramic tile(s) of the IR burner). For example, as shown in FIG. 2, the first ignitor 226 is operatively positioned proximate (e.g., adjacent to) the first burner tube 204, the second ignitor 228 is operatively positioned proximate (e.g., adjacent to) the second burner tube 206, the third ignitor 230 is operatively positioned proximate (e.g., adjacent to) the third burner tube 208, the fourth ignitor 232 is operatively positioned proximate (e.g., adjacent to) the fourth burner tube 210, the fifth ignitor 234 is operatively positioned proximate (e.g., adjacent to) the fifth burner tube 212, and the sixth ignitor 236 is operatively positioned proximate (e.g., adjacent to) the IR burner 214, with each such ignitor including a spark generator configured to generate and/or produce a spark to ignite a flow of gas passing through and/or emanating from the corresponding burner.

Each one of the ignitors (e.g., the first ignitor 226, the second ignitor 228, the third ignitor 230, the fourth ignitor 232, the fifth ignitor 234, and the sixth ignitor 236) of FIG. 2 is electrically connected to the ignition module 120 (e.g., including the ignition circuitry 122 and/or the flame sense circuitry 124) of FIG. 2 by a corresponding one of the ignition lines (e.g., the first ignition line 238, the second ignition line 240, the third ignition line 242, the fourth ignition line 244, the fifth ignition line 246, and the sixth ignition line 248) of FIG. 2. For example, as shown in FIG. 2, the first ignitor 226 is electrically connected to the ignition module 120 via the first ignition line 238, the second ignitor 228 is electrically connected to the ignition module 120 via the second ignition line 240, the third ignitor 230 is electrically connected to the ignition module 120 via the third ignition line 242, the fourth ignitor 232 is electrically connected to the ignition module 120 via the fourth ignition line 244, the fifth ignitor 234 is electrically connected to the ignition module 120 via the fifth ignition line 246, and the sixth ignitor 236 is electrically connected to the ignition module 120 via the sixth ignition line 248. In some examples, each one of the ignition lines of FIG. 2 includes one or more wire(s) configured to carry and/or transmit electrical signals.

In the illustrated example of FIG. 2, each one of the ignition lines is configured to carry and/or transmit one or more electrical signal(s) (e.g., one or more current(s)) or voltage(s)) from the ignition module 120 to a corresponding one of the ignitors. For example, the first ignition line 238 can carry and/or transmit one or more electrical signal(s) from the ignition module 120 to the first ignitor 226, the second ignition line 240 can carry and/or transmit one or more electrical signal(s) from the ignition module 120 to the second ignitor 228, the third ignition line 242 can carry and/or transmit one or more electrical signal(s) from the ignition module 120 to the third ignitor 230, the fourth ignition line 244 can carry and/or transmit one or more electrical signal(s) from the ignition module 120 to the fourth ignitor 232, the fifth ignition line 246 can carry and/or transmit one or more electrical signal(s) from the ignition module 120 to the fifth ignitor 234, and the sixth ignition line 248 can carry and/or transmit one or more electrical signal(s) from the ignition module 120 to the sixth ignitor 236.

In some examples, an electrical signal carried by one of the ignition lines of FIG. 2 is generated and/or produced by the ignition circuitry 122 of the ignition module 120, with the electrical signal being configured to cause a spark electrode of the corresponding one of the ignitors of FIG. 2 to which the ignition line is electrically connected to generate and/or produce a spark. For example, an electrical signal generated and/or produced by the ignition circuitry 122 and thereafter carried by the first ignition line 238 of FIG. 2 can cause a spark electrode of the first ignitor 226 of FIG. 2 to generate and/or produce a spark in proximity to the first burner tube 204 of FIG. 2. As another example, an electrical signal generated and/or produced by the ignition circuitry 122 and thereafter carried by the second ignition line 240 of FIG. 2 can cause a spark electrode of the second ignitor 228 of FIG. 2 to generate and/or produce a spark in proximity to the second burner tube 206 of FIG. 2.

In other examples, an electrical signal carried by one of the ignition lines of FIG. 2 is generated and/or produced by the flame sense circuitry 124 of the ignition module 120, with the electrical signal being utilized in connection with the flame sense circuitry 124 detecting and/or determining whether a flame is present at the corresponding one of the burners of FIG. 2 associated with (e.g., located proximate to) the corresponding one of the ignitors of FIG. 2 to which the ignition line is electrically connected. For example, an electrical signal generated and/or produced by the flame sense circuitry 124 and thereafter carried by the first ignition line 238 of FIG. 2 can be utilized in connection with the flame sense circuitry 124 detecting and/or determining whether a flame is present at the first burner tube 204 of FIG. 2 that is located proximate (e.g., adjacent to) the first ignitor 226 of FIG. 2 to which the first ignition line 238 is electrically connected. As another example, an electrical signal generated and/or produced by the flame sense circuitry 124 and thereafter carried by the second ignition line 240 of FIG. 2 can be utilized in connection with the flame sense circuitry 124 detecting and/or determining whether a flame is present at the second burner tube 206 of FIG. 2 that is located proximate (e.g., adjacent to) the second ignitor 228 of FIG. 2 to which the second ignition line 240 is electrically connected.

The return line fastener 250 of the flame sense system 200 of FIG. 2 is implemented by a conductive material and, more preferably, by a conductive metal. One or more portion(s) of the return line fastener 250 of FIG. 2 is/are mechanically coupled and/or mechanically couplable to the bus bar 202 of FIG. 2. In some examples, the return lines fastener 250 is implemented as a threaded post and a threaded nut, wherein the threaded post is fixedly coupled to the bus bar 202 and the threaded nut is configured to threadedly engage the threaded post. In such examples, the threaded nut of the return line fastener 250 can be utilized to mechanically secure one or more return line(s) (e.g., the first return line 252 and/or the second return line 254 of FIG. 2) to the threaded post of the return line fastener 250 and/or to the bus bar 202. Mechanically securing such return line(s) to the threaded post of the return line fastener 250 and/or to the bus bar 202 via the threaded nut of the return line fastener 250 electrically connects such return line(s) to the bus bar 202, and mechanically secures such electrical connection(s). In some examples, the return line fastener 250 is electrically grounded.

The first return line 252 of the flame sense system 200 of FIG. 2 extends between the return line fastener 250 of FIG. 2 and the ignition module 120 of FIG. 2 such that the first return line 252 electrically connects the return line fastener 250 and/or the bus bar 202 to the ignition circuitry 122 and/or the flame sense circuitry 124. As shown in FIG. 2, the first return line 252 is mechanically secured to the bus bar 202 via the return line fastener 250. In some examples, the first return line 252 of FIG. 2 includes one or more wire(s)

configured to carry and/or transmit electrical signals. In some examples, the first return line 252 is electrically grounded.

In the illustrated example of FIG. 2, the first return line 252 is configured to carry and/or transmit one or more electrical signal(s) (e.g., one or more current(s)) or voltage(s)) from the bus bar 202 to the ignition module 120. In some examples, an electrical signal to be carried by the first return line 252 of FIG. 2 is initially received at the bus bar 202 from one of the burner tubes that is electrically connected to the bus bar 202. The electrical signal is thereafter transmitted from the bus bar 202 to the flame sense circuitry 124 of the ignition module 120 via the first return line 252, with the electrical signal then being utilized in connection with the flame sense circuitry 124 detecting and/or determining whether a flame is present at the corresponding one of the burners. For example, an electrical signal received at the bus bar 202 from the first burner tube 204 can thereafter be transmitted from the bus bar 202 to the flame sense circuitry 124 of the ignition module 120 via the first return line 252, with the electrical signal then being utilized in connection with the flame sense circuitry 124 detecting and/or determining whether a flame is present at the first burner tube 204. As another example, an electrical signal received at the bus bar 202 from the second burner tube 206 can thereafter be transmitted from the bus bar 202 to the flame sense circuitry 124 of the ignition module 120 via the first return line 252, with the electrical signal then being utilized in connection with the flame sense circuitry 124 detecting and/or determining whether a flame is present at the second burner tube 206.

The second return line 254 of the flame sense system 200 of FIG. 2 extends between the IR burner 214 of FIG. 2 and the return line fastener 250 of FIG. 2 such that the second return line 254 electrically connects the IR burner 214 to the return line fastener 250. By virtue of being electrically connected to the return line fastener 250, the IR burner 214 and/or the second return line 254 of FIG. 2 is/are also electrically connected to the bus bar 202, the first return line 252, and/or the ignition module 120 (e.g., the ignition circuitry 122 and/or the flame sense circuitry 124) of FIG. 2. The second return line 254 is mechanically secured to the bus bar 202 via the return line fastener 250. In some examples, the second return line 254 of FIG. 2 includes one or more wire(s) configured to carry and/or transmit electrical signals. In some examples, the second return line 254 is electrically grounded.

In the illustrated example of FIG. 2, the second return line 254 is configured to carry and/or transmit one or more electrical signal(s) (e.g., one or more current(s)) or voltage(s)) from the IR burner 214 to the bus bar 202, to the return line fastener 250, and/or to the first return line 252. In some examples, an electrical signal carried by the second return line 254 to the bus bar 202, to the return line fastener 250, and/or to the first return line 252 is thereafter transmitted to the flame sense circuitry 124 of the ignition module 120 via the first return line 252, with the electrical signal then being utilized in connection with the flame sense circuitry 124 detecting and/or determining whether a flame is present at the IR burner 214. For example, an electrical signal received at the bus bar 202 from the IR burner 214 via the second return line 254 can thereafter be transmitted from the bus bar 202 to the flame sense circuitry 124 of the ignition module 120 via the first return line 252, with the electrical signal then being utilized in connection with the flame sense circuitry 124 detecting and/or determining whether a flame is present at the IR burner 214.

The ignition circuitry 122 as shown in FIG. 2 is configured to implement one or more operation(s) associated with respective ones of the ignitors of FIG. 2. For example, in association with one or more instruction(s), command(s), and/or signal(s) received from and/or one or more operation(s) performed by the controller 136 of FIG. 1, the ignition circuitry 122 can transmit an electrical signal over the first ignition line 238 of FIG. 2 that causes a spark to be generated at a spark electrode of the first ignitor 226 of FIG. 2, thereby causing the first ignitor 226 to ignite a flow of gas passing through and/or emanating from the first burner tube 204 of FIG. 2. As another example, in association with one or more instruction(s), command(s), and/or signal(s) received from and/or one or more operation(s) performed by the controller 136 of FIG. 1, the ignition circuitry 122 can transmit an electrical signal over the second ignition line 240 of FIG. 2 that causes a spark to be generated at a spark electrode of the second ignitor 228 of FIG. 2, thereby causing the second ignitor 228 to ignite a flow of gas passing through and/or emanating from the second burner tube 206 of FIG. 2. As yet another example, in association with one or more instruction(s), command(s), and/or signal(s) received from and/or one or more operation(s) performed by the controller 136 of FIG. 1, the ignition circuitry 122 can transmit an electrical signal over the sixth ignition line 248 of FIG. 2 that causes a spark to be generated at a spark electrode of the sixth ignitor 236 of FIG. 2, thereby causing the sixth ignitor 236 to ignite a flow of gas passing through and/or emanating from the ceramic tile(s) of the IR burner 214 of FIG. 2.

The flame sense circuitry 124 as shown in FIG. 2 is configured to implement one or more operation(s) associated with detecting a presence of a flame at respective ones of the burners of FIG. 2. For example, in association with one or more instruction(s), command(s), and/or signal(s) received from and/or one or more operation(s) performed by the controller 136 of FIG. 1, the flame sense circuitry 124 can detect and/or determine whether a flame is present at the first burner tube 204 of FIG. 2 based in part on an electrical signal received at the flame sense circuitry 124 over the first return line 252 of FIG. 2. As another example, in association with one or more instruction(s), command(s), and/or signal(s) received from and/or one or more operation(s) performed by the controller 136 of FIG. 1, the flame sense circuitry 124 can detect and/or determine whether a flame is present at the second burner tube 206 of FIG. 2 based in part on an electrical signal received at the flame sense circuitry 124 over the first return line 252 of FIG. 2. As yet another example, in association with one or more instruction(s), command(s), and/or signal(s) received from and/or one or more operation(s) performed by the controller 136 of FIG. 1, the flame sense circuitry 124 can detect and/or determine whether a flame is present at the IR burner 214 of FIG. 2 based in part on an electrical signal received at the flame sense circuitry 124 over the first return line 252 of FIG. 2, with said electrical signal having first traveled over the second return line 254 of FIG. 2. In some examples, the flame sense circuitry 124 detects the presence of a flame at a specific one of the burners of FIG. 2 by emitting a voltage across a corresponding one of the ignitors of FIG. 2 and the first return line 252 of FIG. 2 of the flame sense circuitry 124, and then measuring the amount of current passing from the corresponding one of the ignitors and the first return line 252. In other examples, the flame sense circuitry 124 detects the presence of a flame at a specific one of the burners of FIG. 2 by measuring the voltage across a corresponding specific one of the ignitors of FIG. 2 and the first return line 252.

Figure 3:
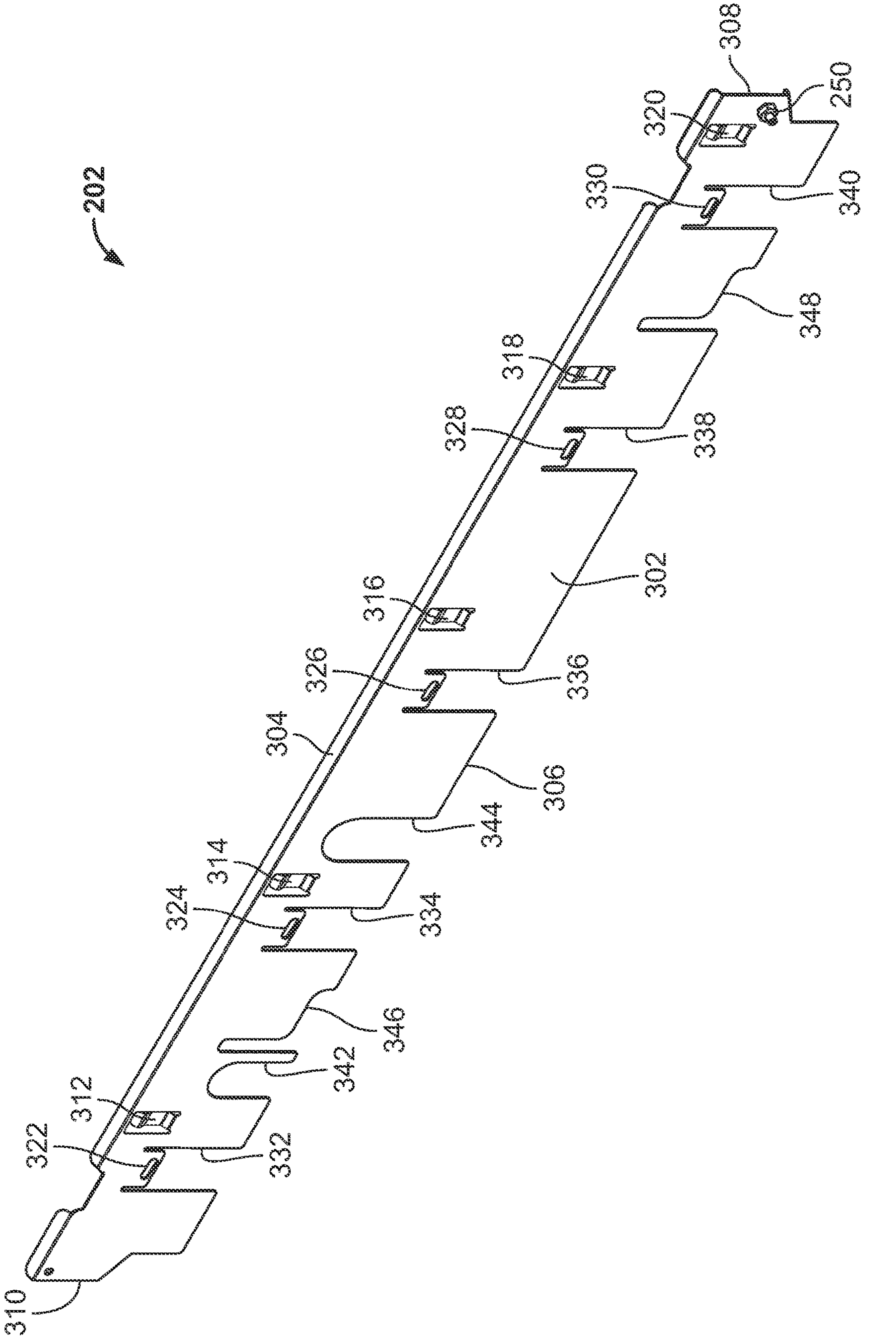
FIG. 3 is a first perspective view of an example implementation of the bus bar of FIG. 2.
Figure 4:
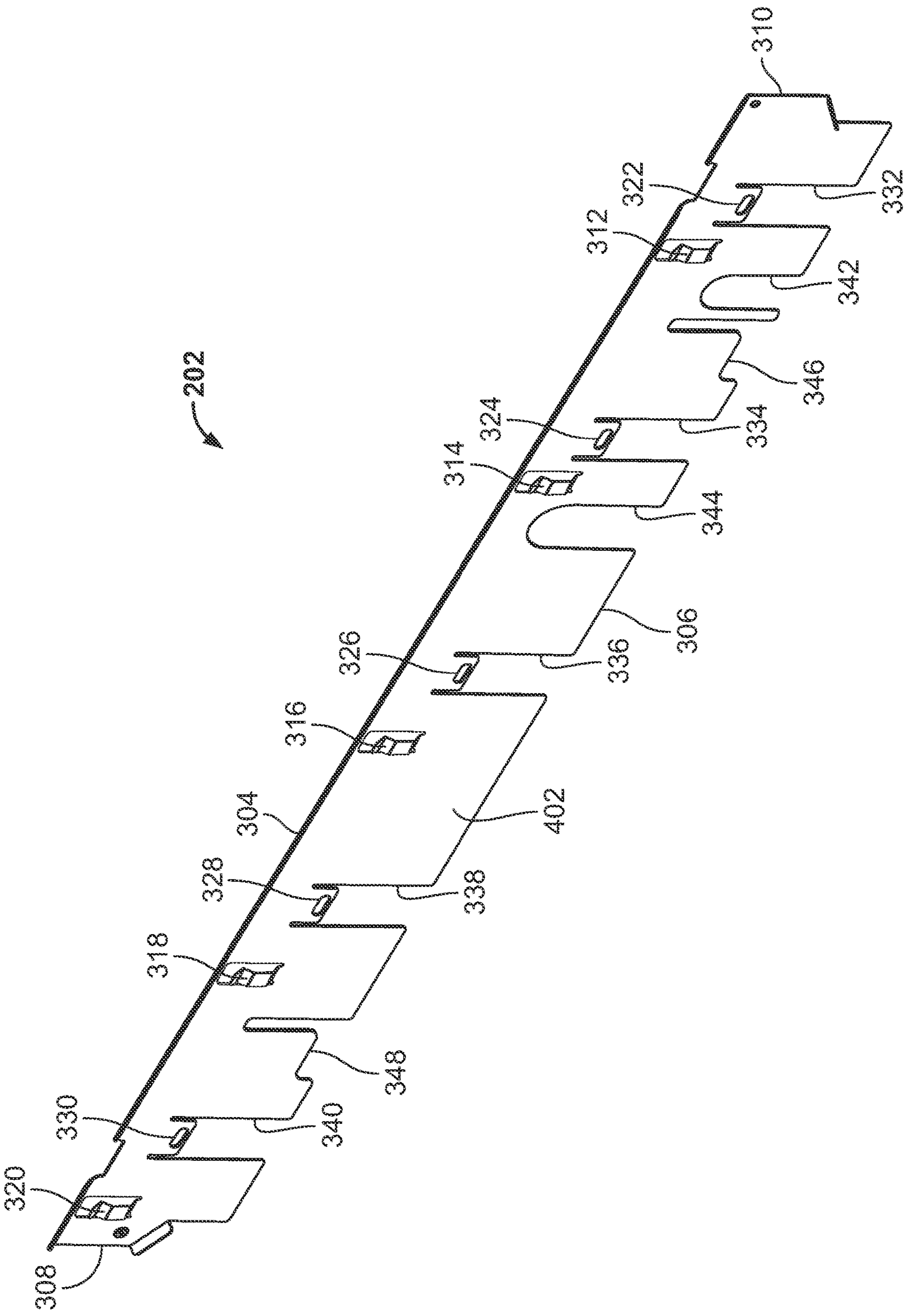
FIG. 4 is a second perspective view of the bus bar as shown in FIG. 3.
Figure 5:
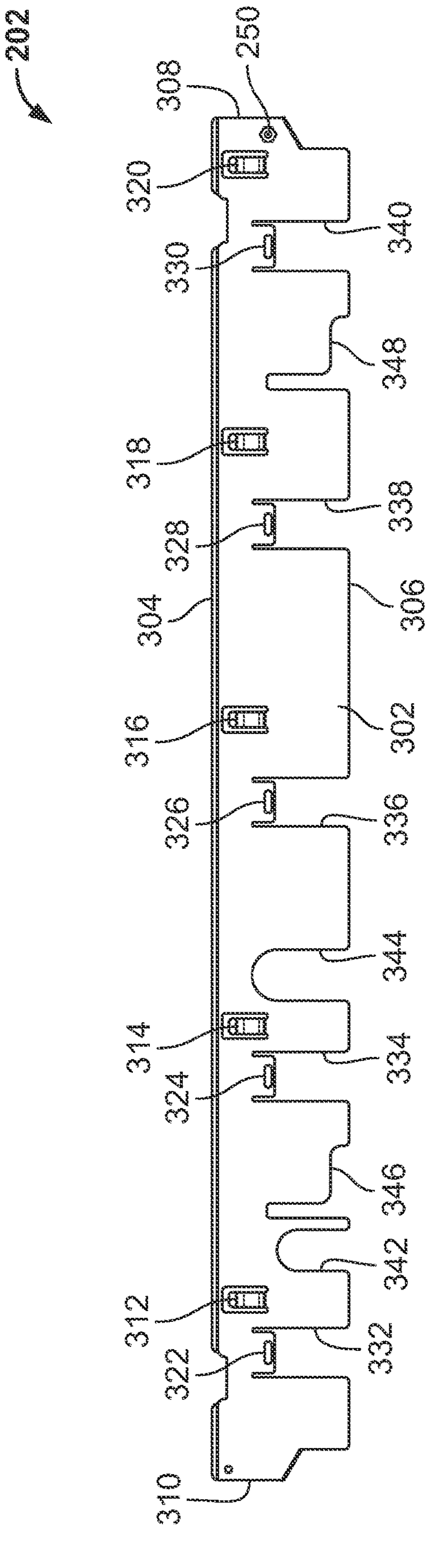
FIG. 5 is a front view of the bus bar as shown in FIGS. 3 and 4.
Figure 6:
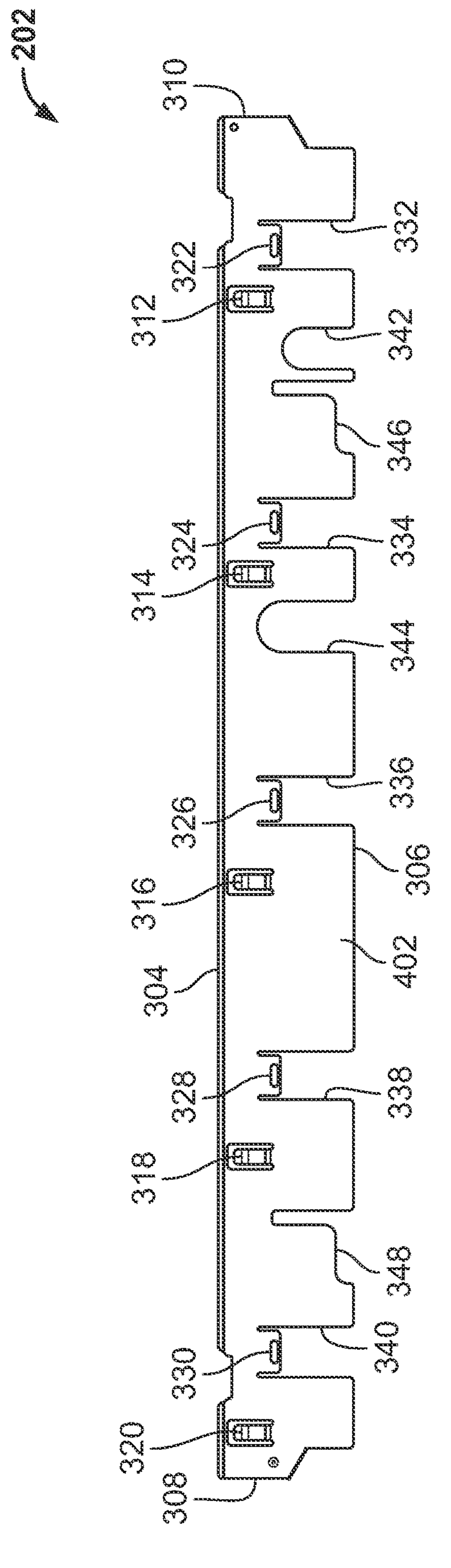
FIG. 6 is a rear view of the bus bar as shown in FIGS. 3-5.
Figure 8:
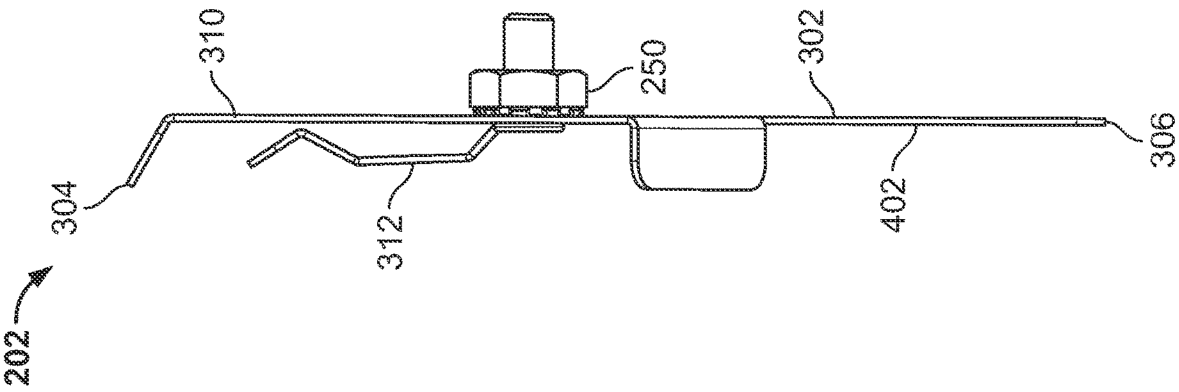
FIG. 8 is a left side view of the bus bar as shown in FIGS. 3-7.
Figure 7:
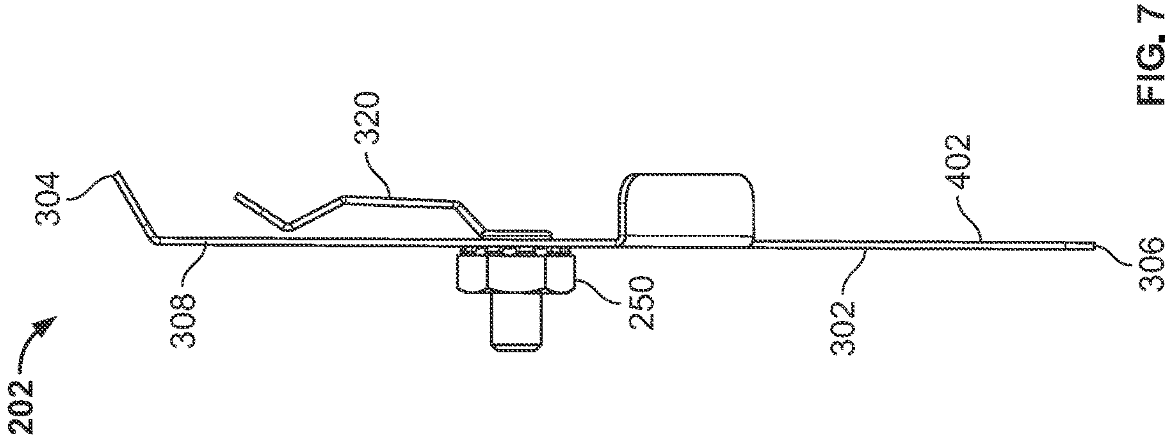
FIG. 7 is a right side view of the bus bar as shown in FIGS. 3-6.

FIG. 3 is a first perspective view of an example implementation of the bus bar 202 of FIG. 2. FIG. 4 is a second perspective view of the bus bar 202 as shown in FIG. 3. FIG. 5 is a front view of the bus bar 202 as shown in FIGS. 3 and 4. FIG. 6 is a rear view of the bus bar 202 as shown in FIGS. 3-5. FIG. 7 is a right side view of the bus bar 202 as shown in FIGS. 3-6. FIG. 8 is a left side view of the bus bar 202 as shown in FIGS. 3-7. As shown in FIGS. 3-8, the bus bar 202 is configured for a six-burner implementation of the gas grill 100 in which five of the six burners are implemented as burner tubes, and the remaining one of the six burners is implemented as an IR burner. As discussed above in connection with FIGS. 1 and 2, the gas grill 100 can be implemented with many other number(s), type(s), and/or combination(s) of burners. The bus bar 202 shown in FIGS. 3-8 can be scaled up or scaled down accordingly to accommodate the implemented number, the implemented type, and/or the implemented combination of burners of the gas grill 100. The bus bar 202 of FIGS. 3-8 is constructed as a panel formed from a conductive material and, more preferably, from a conductive metal. In some examples, the bus bar 202 of FIGS. 3-8 is formed from sheet metal (e.g., stainless steel sheet metal).

As shown in FIGS. 3-8, the bus bar 202 includes an example front surface 302, an example rear surface 402, an example upper edge 304, an example lower edge 306, an example right edge 308, and an example left edge 310. The rear surface 402 of the bus bar 202 is located opposite the front surface 302 of the bus bar 202. The lower edge 306 of the bus bar 202 is located opposite the upper edge 304 of the bus bar 202. The left edge 310 of the bus bar 202 is located opposite the right edge 308 of the bus bar 202. As shown in FIGS. 3-8, the return line fastener 250 described above in connection with FIG. 2 is coupled to the bus bar 202. In the illustrated example of FIGS. 3-8, the return line fastener 250 is located proximate the right edge 308 of the bus bar 202 between the upper edge 304 and the lower edge 306 of the bus bar 202. In other examples, the return line fastener 250 can instead be located at a different position on the bus bar 202 (e.g., proximate the left edge 310 of the bus bar 202 between the upper edge 304 and the lower edge 306 of the bus bar 202). In the illustrated example of FIGS. 3-8, the return line fastener 250 extends forwardly from and/or is otherwise located forward of the front surface 302 of the bus bar 202. In other examples, the return line fastener 250 can instead extend rearwardly from and/or otherwise be located rearward of the rear surface 402 of the bus bar 202.

The bus bar 202 as shown in FIGS. 3-8 further includes a plurality of clips (e.g., an example first clip 312, an example second clip 314, an example third clip 316, an example fourth clip 318, and an example fifth clip 320), with each one of the clips being configured to receive, hold, and/or retain one or more ignition line(s) associated with one or more ignitor(s) of the gas grill 100. For example, the first clip 312 is configured to receive, hold, and/or retain the first ignition line 238 of FIG. 2 associated with the first ignitor 226 of FIG. 2. As another example, the second clip 314 is configured to receive, hold, and/or retain the second ignition line 240 of FIG. 2 associated with the second ignitor 228 of FIG. 2. In some examples, the second clip 314 is configured to concurrently receive, hold, and/or retain the first ignition line 238 of FIG. 2 associated with the first ignitor 226 of FIG. 2 as well as the second ignition line 240 of FIG. 2 associated with the second ignitor 228 of FIG. 2. In the illustrated example of FIGS. 3-8, each one of the clips (e.g., the first clip 312, the second clip 314, the third clip 316, the fourth clip 318, and the fifth clip 320) is integrally formed by and/or from the bus bar 202. In other examples, one or more (e.g., each one) of the clips can instead be coupled to the bus bar 202 via a corresponding fastener. In the illustrated example of FIGS. 3-8, each one of the clips projects rearwardly from the rear surface 402 of the bus bar 202 such that the clip is configured to receive, hold, and/or retain one or more of the ignition lines adjacent and/or along the rear surface 402 of the bus bar 202. In other examples, one or more (e.g., each one) of the clips can instead project forwardly from the front surface 302 of the bus bar 202 such that the clip is configured to receive, hold, and/or retain one or more of the ignition lines adjacent and/or along the front surface 302 of the bus bar 202.

The bus bar 202 as shown in FIGS. 3-8 further includes a plurality of openings (e.g., an example first opening 322, an example second opening 324, an example third opening 326, an example fourth opening 328, and an example fifth opening 330) extending through the bus bar 202 (e.g., from the front surface 302 through to the rear surface 402 of the bus bar 202), with each one of the openings being configured to receive a corresponding one of the burner tube fasteners (e.g., the first burner tube fastener 216, the second burner tube fastener 218, the third burner tube fastener 220, the fourth burner tube fastener 222, and the fifth burner tube fastener 224) of FIG. 2 to mechanically couple and/or to electrically connect a corresponding one of the burner tubes (e.g., the first burner tube 204, the second burner tube 206, the third burner tube 208, the fourth burner tube 210, and the fifth burner tube 212) of FIG. 2 to the bus bar 202 of FIGS. 3-8. For example, the first opening 322 of the bus bar 202 of FIGS. 3-8 is configured to receive the first burner tube fastener 216 of FIG. 2 to mechanically couple and/or to electrically connect the first burner tube 204 of FIG. 2 to the bus bar 202. As another example, the second opening 324 of the bus bar 202 of FIGS. 3-8 is configured to receive the second burner tube fastener 218 of FIG. 2 to mechanically couple and/or to electrically connect the second burner tube 206 of FIG. 2 to the bus bar 202.

The bus bar 202 as shown in FIGS. 3-8 further includes a plurality of burner tube cutouts (e.g., an example first burner tube cutout 332, an example second burner tube cutout 334, an example third burner tube cutout 336, an example fourth burner tube cutout 338, and an example fifth burner tube cutout 340) formed in and extending through the bus bar 202 (e.g., from the front surface 302 through to the rear surface 402 of the bus bar 202), with each one of the burner tube cutouts being configured to receive a portion (e.g., a front portion) of a corresponding one of the burner tubes (e.g., the first burner tube 204, the second burner tube 206, the third burner tube 208, the fourth burner tube 210, and the fifth burner tube 212) of FIG. 2 such that a front end of the corresponding one of the burner tubes is located forward of the front surface 302 of the bus bar 202. For example, the first burner tube cutout 332 of the bus bar 202 of FIGS. 3-8 is configured to receive a portion (e.g., a front portion) of the first burner tube 204 of FIG. 2 such that a front end of the first burner tube 204 is located forward of the front surface 302 of the bus bar 202. As another example, the second burner tube cutout 334 of the bus bar 202 of FIGS. 3-8 is configured to receive a portion (e.g., a front portion) of the second burner tube 206 of FIG. 2 such that a front end of the second burner tube 206 is located forward of the front surface 302 of the bus bar 202.

In the illustrated example of FIGS. 3-8, each one of the burner tube cutouts is formed along and/or opens outwardly toward the lower edge 306 of the bus bar 202. In other examples, one or more (e.g., each one) of the burner tube cutouts can instead be formed along and/or open outwardly toward the upper edge 304 of the bus bar 202. In some examples, one or more (e.g., each one) of the burner tube cutouts is additionally or alternatively configured to receive a portion (e.g., an outlet conduit or an outlet nozzle) of a corresponding one of the valves associated with the corresponding one of the burner tubes. For example, the first burner tube cutout 332 of the bus bar 202 of FIGS. 3-8 is configured to receive a portion (e.g., an outlet conduit or an outlet nozzle) of a first valve associated with the first burner tube 204 of FIG. 2. As another example, the second burner tube cutout 334 of the bus bar 202 of FIGS. 3-8 is configured to receive a portion (e.g., an outlet conduit or an outlet nozzle) of a second valve associated with the second burner tube 206 of FIG. 2.

The bus bar 202 as shown in FIGS. 3-8 further includes an example IR burner valve cutout 342 formed in and extending through the bus bar 202 (e.g., from the front surface 302 through to the rear surface 402 of the bus bar 202), with the IR burner valve cutout 342 being configured to receive a portion of a valve associated with the IR burner 214 of FIG. 2. In the illustrated example of FIGS. 3-8, the IR burner valve cutout 342 is formed along and/or opens outwardly toward the lower edge 306 of the bus bar 202. In other examples, the IR burner valve cutout 342 can instead be formed along and/or open outwardly toward the upper edge 304 of the bus bar 202. The bus bar 202 as shown in FIGS. 3-8 further includes an example inlet conduit cutout 344 formed in and extending through the bus bar 202 (e.g., from the front surface 302 through to the rear surface 402 of the bus bar 202), with the inlet conduit cutout 344 being configured to receive a portion of an inlet conduit associated with the manifold 106 of the gas grill 100 of FIG. 1. In the illustrated example of FIGS. 3-8, the inlet conduit cutout 344 is formed along and/or opens outwardly toward the lower edge 306 of the bus bar 202. In other examples, the inlet conduit cutout 344 can instead be formed along and/or open outwardly toward the upper edge 304 of the bus bar 202.

The bus bar 202 as shown in FIGS. 3-8 further includes a plurality of cookbox mounting bracket cutouts (e.g., an example first cookbox mounting bracket cutout 346 and an example second cookbox mounting bracket cutout 348) formed in and extending through the bus bar 202 (e.g., from the front surface 302 through to the rear surface 402 of the bus bar 202), with each one of the cookbox mounting bracket cutouts being configured to receive a portion of a corresponding one of a plurality of cookbox mounting brackets that mechanically couple the manifold 106 of the gas grill 100 of FIG. 1 to a cookbox of the gas grill 100. In the illustrated example of FIGS. 3-8, each one of the cookbox mounting bracket cutouts is formed along and/or opens outwardly toward the lower edge 306 of the bus bar 202. In other examples, one or more (e.g., each one) of the cookbox mounting bracket cutouts can instead be formed along and/or open outwardly toward the upper edge 304 of the bus bar 202.

Figure 9:
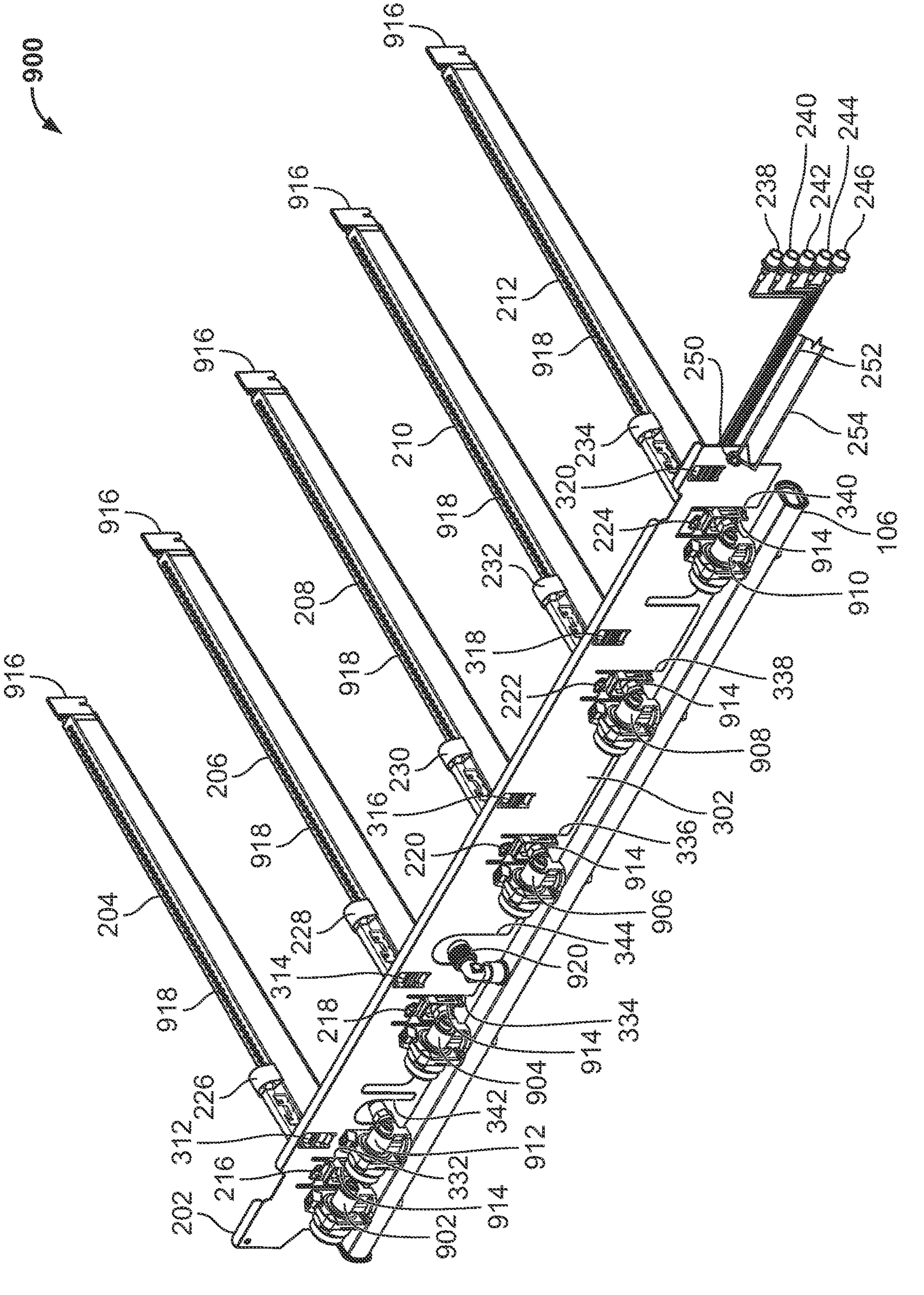
FIG. 9 is a first perspective view of an example burner assembly including the bus bar as shown in FIGS. 3-8.
Figure 10:
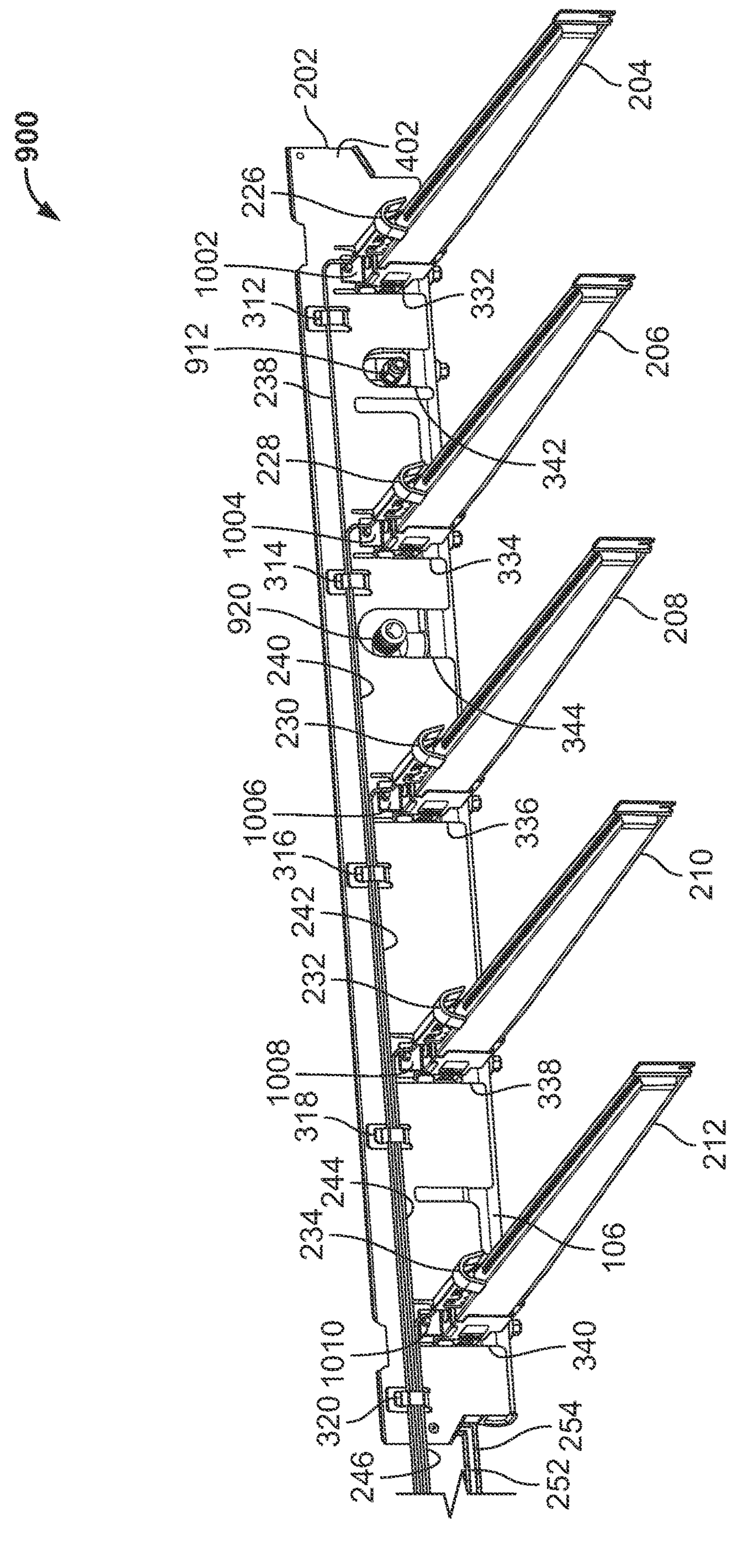
FIG. 10 is a second perspective view of the burner assembly as shown in FIG. 9.
Figure 11:
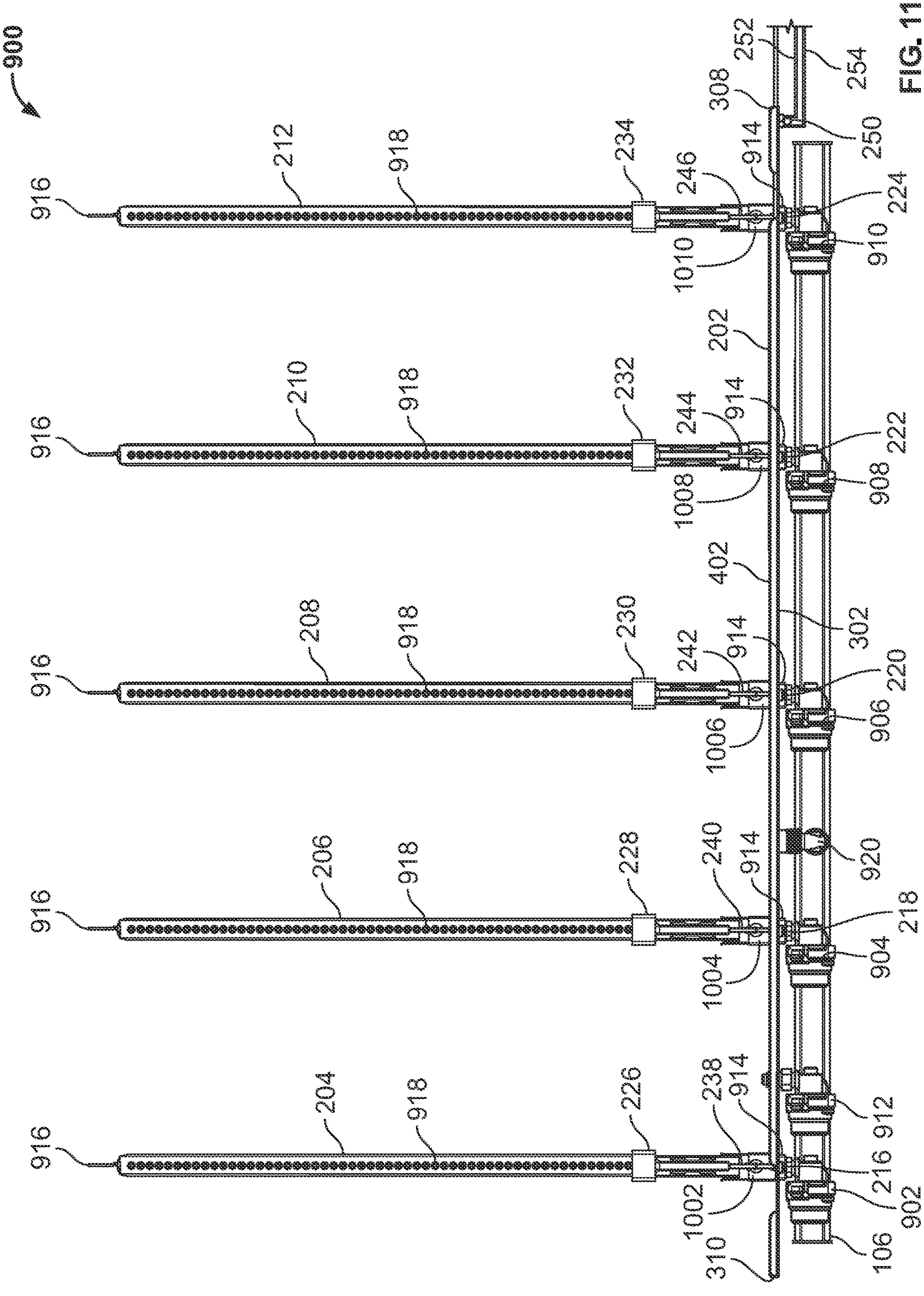
FIG. 11 is a top view of the burner assembly as shown in FIGS. 9 and 10.
Figure 12:
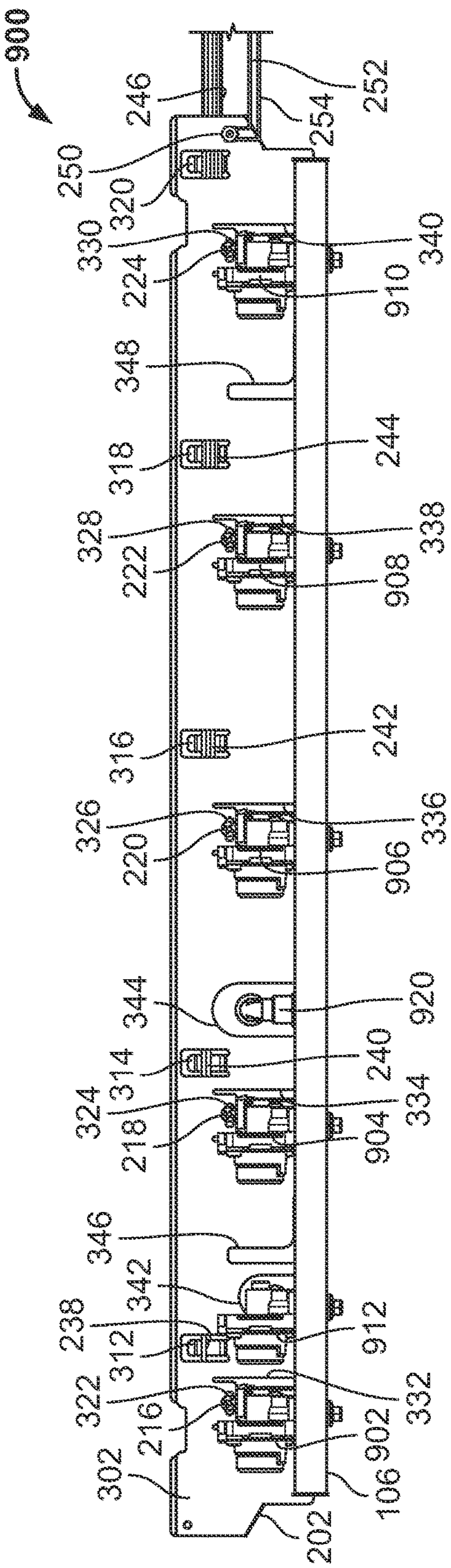
FIG. 12 is a front view of the burner assembly as shown in FIGS. 9-11.
Figure 13:
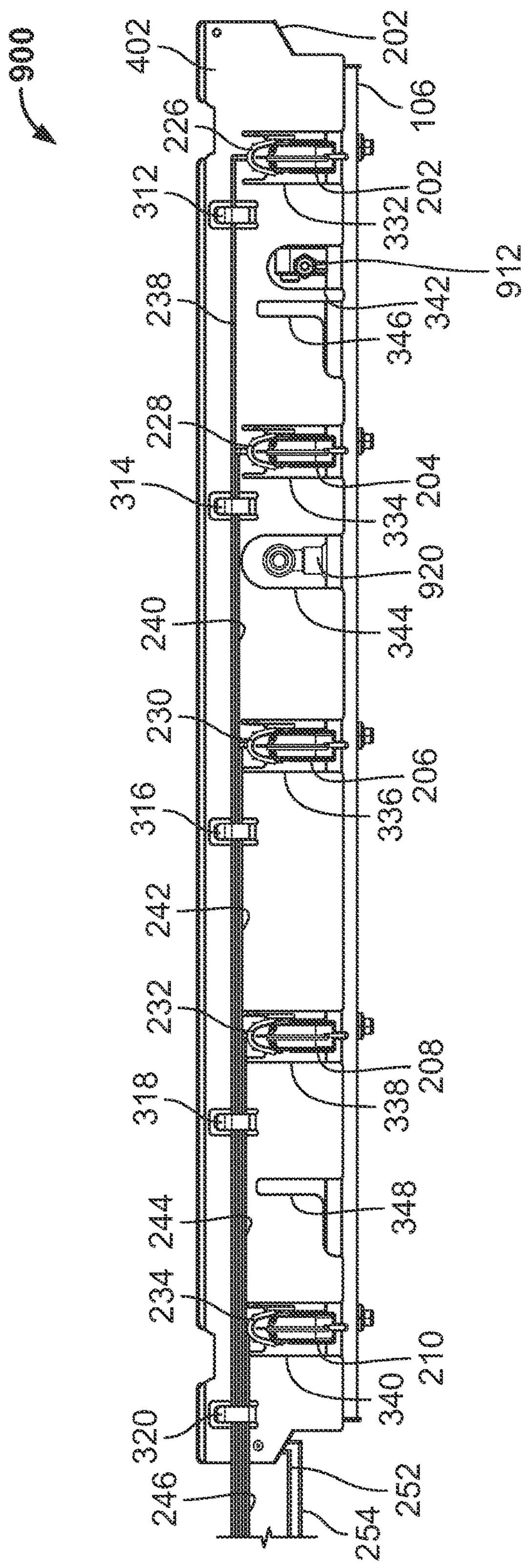
FIG. 13 is a rear view of the burner assembly as shown in FIGS. 9-12.
Figure 14:
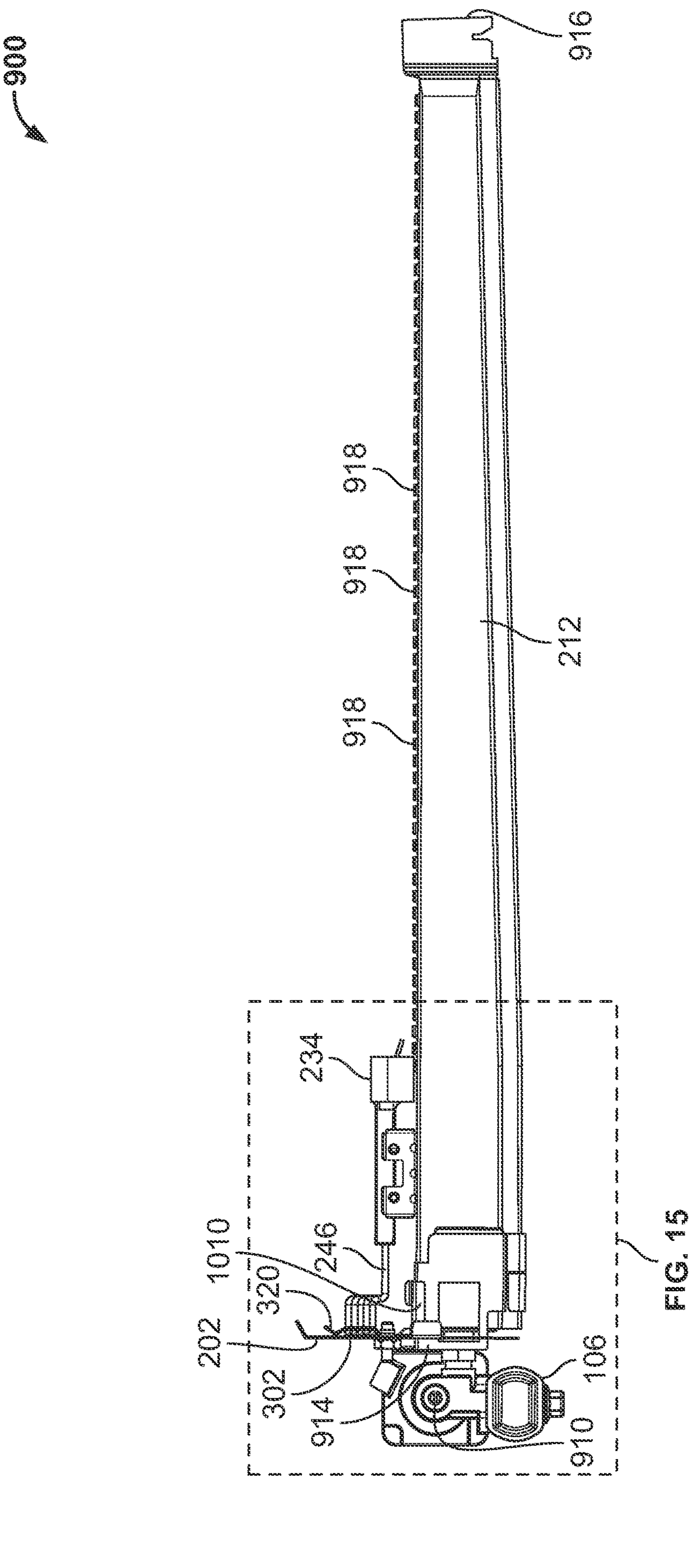
FIG. 14 is a right side view of the burner assembly as shown in FIGS. 9-13.
Figure 15:
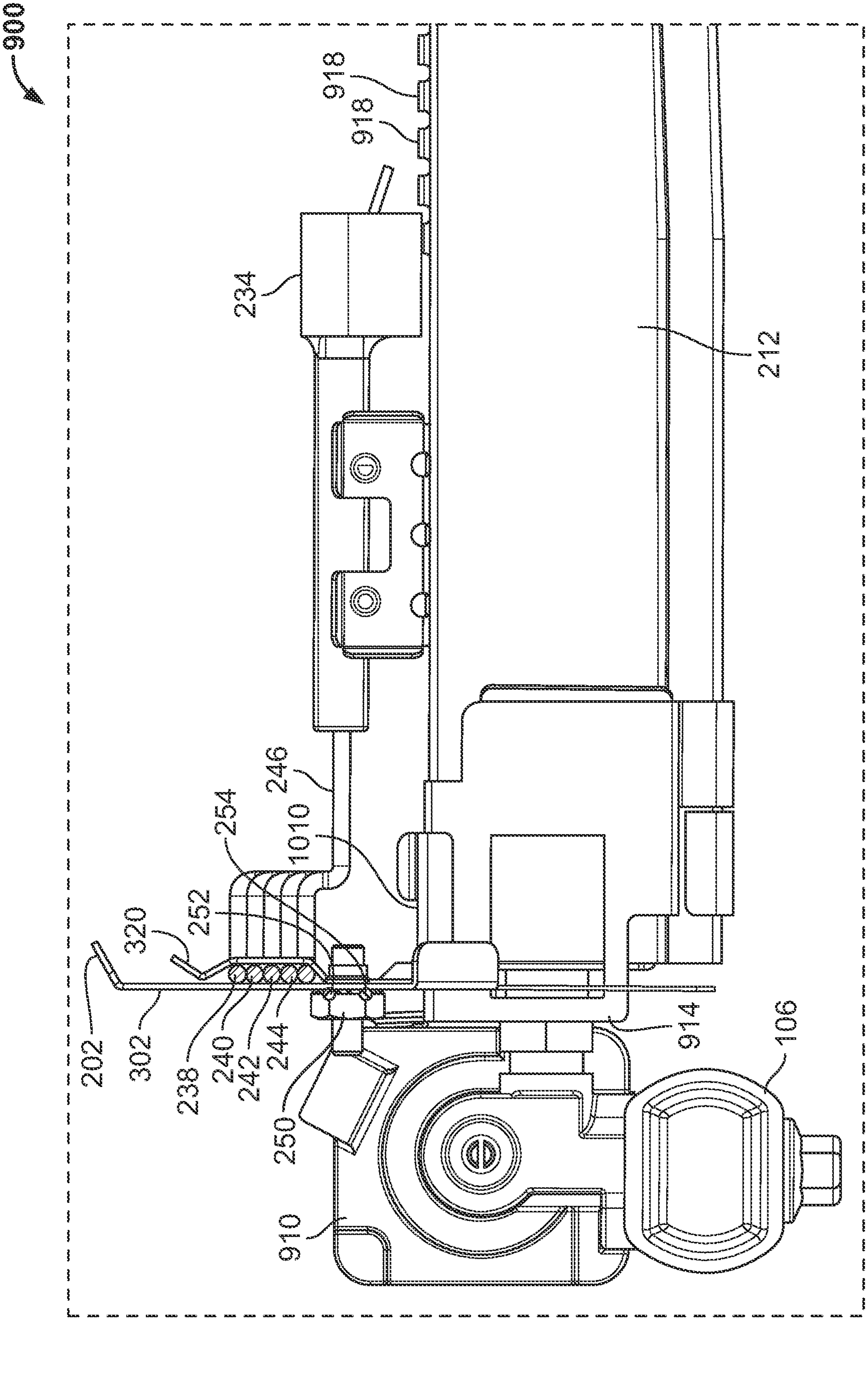
FIG. 15 is an enlarged view of a portion of FIG. 14.
Figure 16:
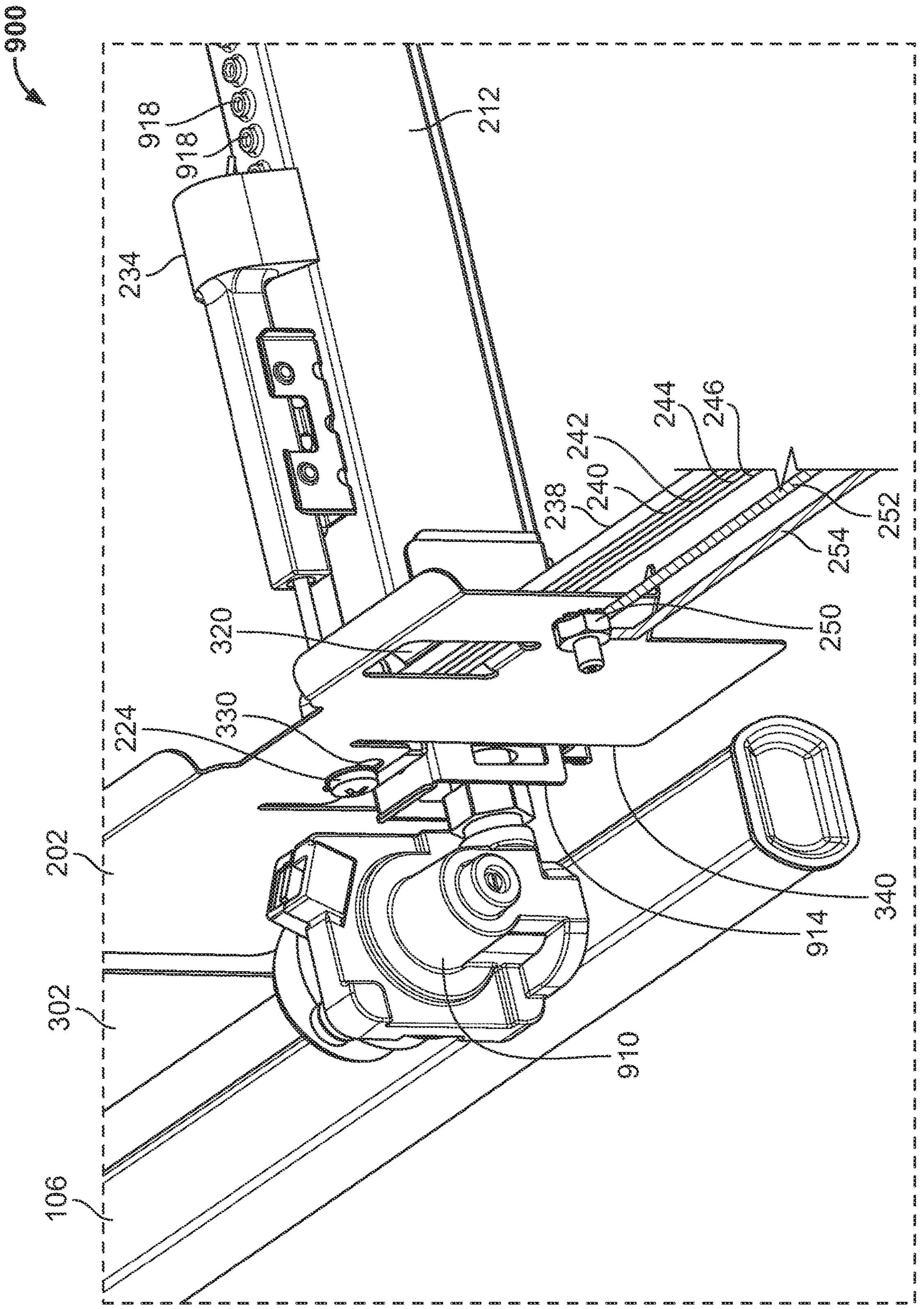
FIG. 16 is a first angled side view of FIG. 15.
Figure 17:
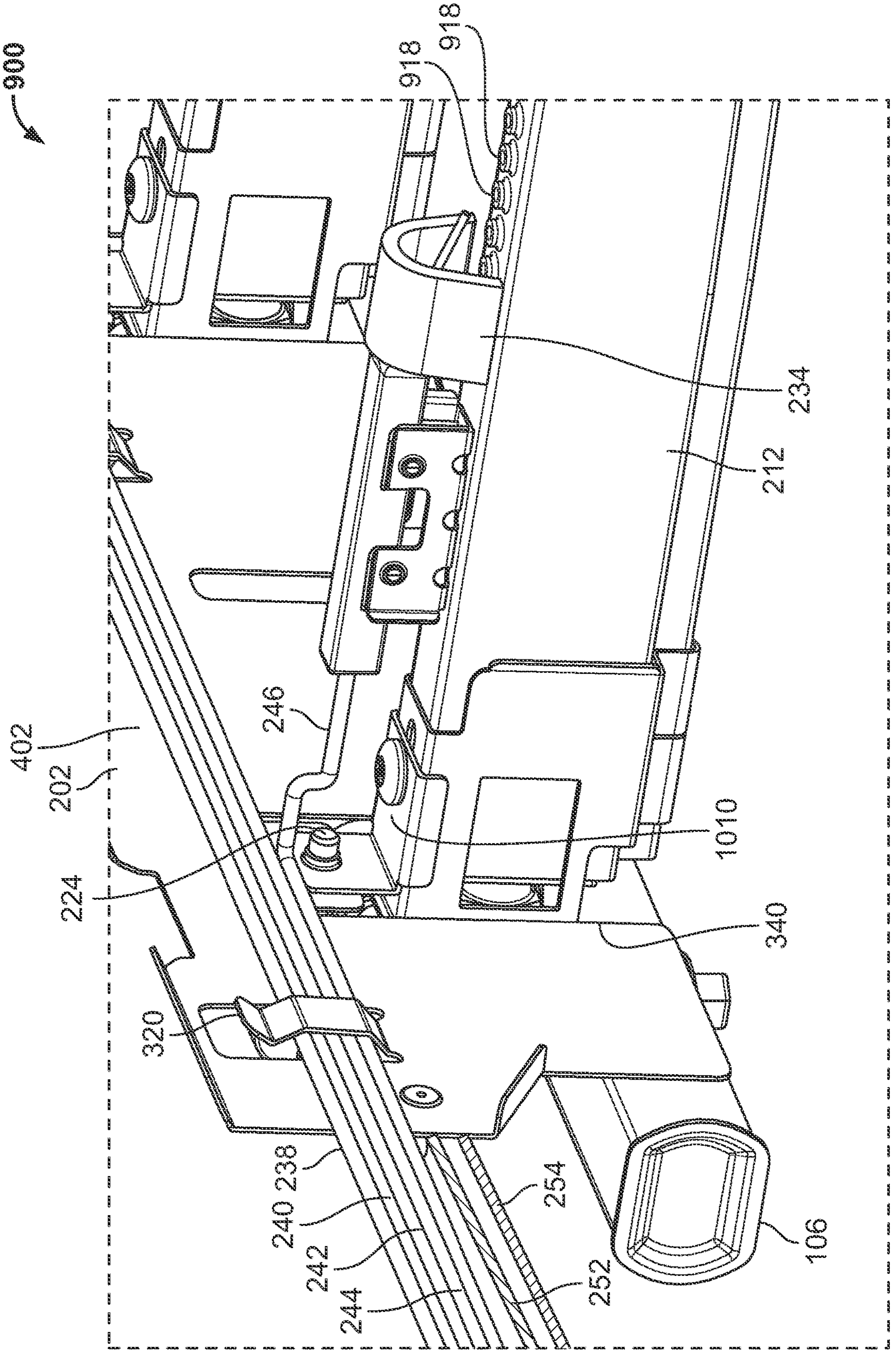
FIG. 17 is a second angled side view of FIG. 16.

FIG. 9 is a first perspective view of an example burner assembly 900 including the bus bar 202 as shown in FIGS. 3-8. FIG. 10 is a second perspective view of the burner assembly 900 as shown in FIG. 9. FIG. 11 is a top view of the burner assembly 900 as shown in FIGS. 9 and 10. FIG. 12 is a front view of the burner assembly 900 as shown in FIGS. 9-11. FIG. 13 is a rear view of the burner assembly 900 as shown in FIGS. 9-12. FIG. 14 is a right side view of the burner assembly 900 as shown in FIGS. 9-13. FIG. 15 is an enlarged view of a portion of FIG. 14. FIG. 16 is a first angled side view of FIG. 15. FIG. 17 is a second angled side view of FIG. 16. In addition to including the bus bar 202 as shown in FIGS. 3-8, the burner assembly 900 of FIGS. 9-17 further includes the first burner tube 204, the second burner tube 206, the third burner tube 208, the fourth burner tube 210, the fifth burner tube 212, the first burner tube fastener 216, the second burner tube fastener 218, the third burner tube fastener 220, the fourth burner tube fastener 222, the fifth burner tube fastener 224, the first ignitor 226, the second ignitor 228, the third ignitor 230, the fourth ignitor 232, the fifth ignitor 234, the first ignition line 238, the second ignition line 240, the third ignition line 242, the fourth ignition line 244, the fifth ignition line 246, the return line fastener 250, the first return line 252, and the second return line 254 of FIG. 2 described above. Although not expressly shown in FIGS. 9-17, the burner assembly 900 further includes the IR burner 214, the sixth ignitor 236, and the sixth ignition line 248 of FIG. 2 described above, with the IR burner 214 being further below in connection with FIGS. 20 and 21. The burner assembly 900 of FIGS. 9-17 is accordingly configured for a six-burner implementation of the gas grill 100 in which five of the six burners are implemented as burner tubes, and the remaining one of the six burners is implemented as an IR burner. As discussed above in connection with FIGS. 1-8, the gas grill 100 can be implemented with many other number(s), type(s), and/or combination(s) of burners. The burner assembly 900 shown in FIGS. 9-17 can be scaled up or scaled down accordingly to accommodate the implemented number, the implemented type, and/or the implemented combination of burners of the gas grill 100.

As shown in FIGS. 9-17, the burner assembly 900 further includes the manifold 106 of the gas grill 100 of FIG. 1 and a plurality of valves (e.g., an example first valve 902, an example second valve 904, an example third valve 906, an example fourth valve 908, an example fifth valve 910, and an example sixth valve 912), with each one of the valves being operatively positioned between the manifold 106 and a corresponding one of the burners (e.g., the first burner tube 204, the second burner tube 206, the third burner tube 208, the fourth burner tube 210, the fifth burner tube 212, and the IR burner 214) of burner assembly 900. For example, the first valve 902 of FIGS. 9-17 is operatively positioned between the manifold 106 and the first burner tube 204 of FIGS. 9-17. As another example, the second valve 904 of FIGS. 9-17 is operatively positioned between the manifold 106 and the second burner tube 206 of FIGS. 9-17. As yet another example, the sixth valve 912 of FIGS. 9-17 is configured to be operatively positioned between the manifold 106 and the IR burner 214 of the burner assembly 900 of FIGS. 9-17. In the illustrated example of FIGS. 9-17, each one of the valves of the burner assembly 900 is implemented as a controllable electric valve (e.g., a solenoid valve). In other examples, one or more (e.g., each one) of the valves of the burner assembly 900 can instead be implemented as a manually-controllable valve.

In the illustrated example of FIGS. 9-17, the bus bar 202 of the burner assembly 900 provides an electrical pathway between the first return line 252 and respective ones of the burner tubes (e.g., the first burner tube 204, the second burner tube 206, the third burner tube 208, the fourth burner tube 210, and the fifth burner tube 212) of the burner assembly 900 such that each one of the burner tubes is electrically connected to the first return line 252 in parallel via the bus bar 202. In some examples, the bus bar 202 is electrically grounded via the first return line 252. As shown in FIGS. 9-17, the respective ones of the burner tubes are spaced apart from one another along the bus bar 202 with each one of the burner tubes being mechanically coupled to the bus bar 202 at a distinct and/or unique location. In the illustrated example of FIGS. 9-17, the respective ones of the burner tubes are oriented parallel to one another, with each one of the burner tubes being configured as a linear burner tube having an example first end 914 (e.g., a front end), an example second end 916 (e.g., a rear end) located opposite the first end 914, and a plurality of example ports 918 located between the first end 914 and the second end 916. The first end 914 of each burner tube includes an opening configured as a gas inlet, with the gas inlet of each burner tube being configured to receive a flow of gas from a corresponding one of the valves of burner assembly 900, and with such received gas thereafter being emitted from the burner tube via respective ones of the ports 918 of the burner tube.

Each one of the burner tubes (e.g., the first burner tube 204, the second burner tube 206, the third burner tube 208, the fourth burner tube 210, and the fifth burner tube 212) of the burner assembly 900 of FIGS. 9-17 is mechanically coupled to the bus bar 202 of the burner assembly 900 via a corresponding one of the burner tube fasteners (e.g., the first burner tube fastener 216, the second burner tube fastener 218, the third burner tube fastener 220, the fourth burner tube fastener 222, and the fifth burner tube fastener 224) of the burner assembly 900. For example, as shown in FIGS. 9-17, the first burner tube 204 is mechanically coupled to the bus bar 202 via the first burner tube fastener 216, the second burner tube 206 is mechanically coupled to the bus bar 202 via the second burner tube fastener 218, the third burner tube 208 is mechanically coupled to the bus bar 202 via the third burner tube fastener 220, the fourth burner tube 210 is mechanically coupled to the bus bar 202 via the fourth burner tube fastener 222, and the fifth burner tube 212 is mechanically coupled to the bus bar 202 via the fifth burner tube fastener 224. In the illustrated example of FIGS. 9-17, each one of the burner tube fasteners is implemented as a machine screw.

The burner assembly 900 of FIGS. 9-17 further includes a plurality of mounting brackets (e.g., an example first mounting bracket 1002, an example second mounting bracket 1004, an example third mounting bracket 1006, an example fourth mounting bracket 1008, and an example fifth mounting bracket 1010) that extend between corresponding ones of the burner tubes and the bus bar 202 (e.g., the first mounting bracket 1002 extends between the first burner tube 204 and the bus bar 202, the second mounting bracket 1004 extends between the second burner tube 206 and the bus bar 202, etc.) of the burner assembly 900. In the illustrated example of FIGS. 9-17, the corresponding ones of the mounting brackets are directly coupled (e.g., via one or more fastener(s)) to corresponding ones of the burner tubes (e.g., the first mounting bracket 1002 is directly coupled to the first burner tube 204, the second mounting bracket 1004 is directly coupled to the second burner tube 206, etc.). Respective ones of the burner tube fasteners extend through corresponding ones of the openings formed in the bus bar 202 and directly couple the corresponding ones of the mounting brackets to the bus bar 202 (e.g., the first burner tube fastener 216 extends through the first opening 322 formed in the bus bar 202 and directly couples the first mounting bracket 1002 to the bus bar 202, the second burner tube fastener 218 extends through the second opening 324 formed in the bus bar 202 and directly couples the second mounting bracket 1004 to the bus bar 202, etc.). Respective ones of the burner tubes are accordingly mechanically coupled to the bus bar 202 via corresponding ones of the mounting brackets and/or corresponding ones of the burner tube fasteners (e.g., the first burner tube 204 is mechanically coupled to the bus bar 202 via the first mounting bracket 1002 and/or the first burner tube fastener 216, the second burner tube 206 is mechanically coupled to the bus bar 202 via the second mounting bracket 1004 and/or the second burner tube fastener 218, etc.).

In addition to being mechanically coupled to the bus bar 202 of the burner assembly 900, each one of the burner tubes (e.g., the first burner tube 204, the second burner tube 206, the third burner tube 208, the fourth burner tube 210, and the fifth burner tube 212) of the burner assembly 900 of FIGS. 9-17 is electrically connected to the bus bar 202 via a corresponding one of the burner tube fasteners and/or a corresponding one of the mounting brackets. In this regard, each one of the burner tube fasteners and/or each one of the mounting brackets is implemented by a conductive material and, more preferably, by a conductive metal such that the corresponding burner tube fastener and/or the corresponding mounting bracket form(s) part of an electrical pathway extending between the corresponding one of the burner tubes and the bus bar 202. For example, a first electrical pathway extends from the first burner tube 204 to the first mounting bracket 1002, and from the first mounting bracket 1002 to the first burner tube fastener 216 and/or to the bus bar 202. In such an example, the first burner tube 204 is accordingly electrically connected to the bus bar 202 via the first mounting bracket 1002 and/or via the first burner tube fastener 216. As another example, a second electrical pathway (e.g., parallel to the first electrical pathway) extends from the second burner tube 206 to a second mounting bracket 1004, and from the second mounting bracket 1004 to the second burner tube fastener 218 and/or to the bus bar 202. In such an example, the second burner tube 206 is accordingly electrically connected to the bus bar 202 (e.g., in parallel relative to the first burner tube 204) via the second mounting bracket 1004 and/or via the second burner tube fastener 218.

Each one of the ignitors (e.g., the first ignitor 226, the second ignitor 228, the third ignitor 230, the fourth ignitor 232, the fifth ignitor 234, and the sixth ignitor 236) of the burner assembly 900 of FIGS. 9-17 is operatively positioned proximate (e.g., adjacent to) a corresponding one of the burners (e.g., the first burner tube 204, the second burner tube 206, the third burner tube 208, the fourth burner tube 210, the fifth burner tube 212, and the IR burner 214) of the burner assembly 900 such that a spark generated by and/or at a spark electrode of the ignitor can ignite a flow of gas passing through and/or emanating from the burner (e.g., through the ports of the respective burner tube, or through the apertures of the ceramic tile(s) of the IR burner). For example, as shown in FIGS. 9-17, the first ignitor 226 is operatively positioned proximate (e.g., adjacent to) the first burner tube 204, the second ignitor 228 is operatively positioned proximate (e.g., adjacent to) the second burner tube 206, the third ignitor 230 is operatively positioned proximate (e.g., adjacent to) the third burner tube 208, the fourth ignitor 232 is operatively positioned proximate (e.g., adjacent to) the fourth burner tube 210, and the fifth ignitor 234 is operatively positioned proximate (e.g., adjacent to) the fifth burner tube 212, with each such ignitor including a spark generator configured to generate and/or produce a spark to ignite a flow of gas passing through and/or emanating from the corresponding burner tube.

Each one of the ignitors (e.g., the first ignitor 226, the second ignitor 228, the third ignitor 230, the fourth ignitor 232, the fifth ignitor 234, and the sixth ignitor 236) of the burner assembly 900 of FIGS. 9-17 is configured to be electrically connected to the ignition module 120 of FIGS. 1 and 2 described above by a corresponding one of the ignition lines (e.g., the first ignition line 238, the second ignition line 240, the third ignition line 242, the fourth ignition line 244, the fifth ignition line 246, and the sixth ignition line 248) of the burner assembly 900. In the illustrated example of FIGS. 9-17, each one of the ignition lines includes one or more wire(s) configured to carry and/or transmit one or more electrical signal(s) (e.g., one or more current(s)) or voltage(s)) from the ignition module 120 to a corresponding one of the ignitors of the burner assembly 900. For example, the first ignition line 238 of FIGS. 9-17 can carry and/or transmit one or more electrical signal(s) from the ignition module 120 to the first ignitor 226 of the burner assembly 900, the second ignition line 240 of FIGS. 9-17 can carry and/or transmit one or more electrical signal(s) from the ignition module 120 to the second ignitor 228 of the burner assembly 900, the third ignition line 242 of FIGS. 9-17 can carry and/or transmit one or more electrical signal(s) from the ignition module 120 to the third ignitor 230 of the burner assembly 900, the fourth ignition line 244 of FIGS. 9-17 can carry and/or transmit one or more electrical signal(s) from the ignition module 120 to the fourth ignitor 232 of the burner assembly 900, and the fifth ignition line 246 of FIGS. 9-17 can carry and/or transmit one or more electrical signal(s) from the ignition module 120 to the fifth ignitor 234 of the burner assembly 900.

The return line fastener 250 of the burner assembly 900 of FIGS. 9-17 is implemented by a conductive material and, more preferably, by a conductive metal. One or more portion(s) of the return line fastener 250 is/are mechanically coupled and/or mechanically couplable to the bus bar 202. As shown in FIGS. 9-17, the return lines fastener 250 is implemented as a threaded post and a threaded nut, wherein the threaded post is fixedly coupled to the bus bar 202 and the threaded nut is configured to threadedly engage the threaded post. The threaded nut of the return line fastener 250 can be utilized to mechanically secure the first return line 252 and/or the second return line 254 of the burner assembly 900 to the threaded post of the return line fastener 250 and/or to the bus bar 202. Mechanically securing such return line(s) to the threaded post of the return line fastener 250 and/or to the bus bar 202 via the threaded nut of the return line fastener 250 electrically connects such return line(s) to the bus bar 202, and mechanically secures such electrical connection(s). In some examples, the return line fastener 250 is electrically grounded.

The first return line 252 of the burner assembly 900 of FIGS. 9-17 is configured to extend between the return line fastener 250 of the burner assembly 900 and the ignition module 120 such that the first return line 252 electrically connects the return line fastener 250 and/or the bus bar 202 to the ignition circuitry 122 and/or the flame sense circuitry 124 of the ignition module 120. As shown in FIGS. 9-17, the first return line 252 is mechanically secured to the bus bar 202 via the return line fastener 250. The first return line 252 of the burner assembly 900 includes one or more wire(s) configured to carry and/or transmit electrical signals. In some examples, the first return line 252 is electrically grounded. In the illustrated example of FIGS. 9-17, the first return line 252 is configured to carry and/or transmit one or more electrical signal(s) (e.g., one or more current(s)) or voltage(s)) from the bus bar 202 to the ignition module 120. In some examples, an electrical signal to be carried by the first return line 252 of the burner assembly 900 is initially received at the bus bar 202 from one of the burner tubes that is electrically connected to the bus bar 202. The electrical signal is thereafter transmitted from the bus bar 202 to the flame sense circuitry 124 of the ignition module 120 via the first return line 252, with the electrical signal then being utilized in connection with the flame sense circuitry 124 detecting and/or determining whether a flame is present at the corresponding one of the burners. For example, an electrical signal received at the bus bar 202 from the first burner tube 204 of the burner assembly 900 can thereafter be transmitted from the bus bar 202 to the flame sense circuitry 124 of the ignition module 120 via the first return line 252, with the electrical signal then being utilized in connection with the flame sense circuitry 124 detecting and/or determining whether a flame is present at the first burner tube 204 of the burner assembly 900. As another example, an electrical signal received at the bus bar 202 from the second burner tube 206 of the burner assembly 900 can thereafter be transmitted from the bus bar 202 to the flame sense circuitry 124 of the ignition module 120 via the first return line 252, with the electrical signal then being utilized in connection with the flame sense circuitry 124 detecting and/or determining whether a flame is present at the second burner tube 206 of the burner assembly 900.

The second return line 254 of the burner assembly 900 of FIGS. 9-17 is configured to extend between the IR burner 214 of the burner assembly 900 and the return line fastener 250 of the burner assembly 900 such that the second return line 254 electrically connects the IR burner 214 to the return line fastener 250. By virtue of being electrically connected to the return line fastener 250, the IR burner 214 and/or the second return line 254 of the burner assembly 900 is/are also electrically connected to the bus bar 202 and/or the first return line 252 of the burner assembly 900, and/or to the ignition module 120. As shown in FIGS. 9-17, the second return line 254 is mechanically secured to the bus bar 202 via the return line fastener 250. The second return line 254 of the burner assembly 900 includes one or more wire(s) configured to carry and/or transmit electrical signals. In some examples, the second return line 254 is electrically grounded. In the illustrated example of FIGS. 9-17, the second return line 254 is configured to carry and/or transmit one or more electrical signal(s) (e.g., one or more current(s)) or voltage(s)) from the IR burner 214 to the bus bar 202, to the return line fastener 250, and/or to the first return line 252. In some examples, an electrical signal carried by the second return line 254 to the bus bar 202, to the return line fastener 250, and/or to the first return line 252 can thereafter transmitted to the flame sense circuitry 124 of the ignition module 120 via the first return line 252, with the electrical signal then being utilized in connection with the flame sense circuitry 124 detecting and/or determining whether a flame is present at the IR burner 214. For example, an electrical signal received at the bus bar 202 from the IR burner 214 via the second return line 254 of the burner assembly 900 can thereafter be transmitted from the bus bar 202 to the flame sense circuitry 124 of the ignition module 120 via the first return line 252 of the burner assembly 900, with the electrical signal then being utilized in connection with the flame sense circuitry 124 detecting and/or determining whether a flame is present at the IR burner 214.

As shown in FIGS. 9-17, each one of the clips (e.g., the first clip 312, the second clip 314, the third clip 316, the fourth clip 318, and the fifth clip 320) of the bus bar 202 of the burner assembly 900 receives, holds, and/or retains one or more of the ignition lines of the burner assembly 900. For example, as shown in FIGS. 9-17, the first clip 312 receives, holds, and/or retains the first ignition line 238 of the burner assembly 900. The second clip 314 receives, holds, and/or retains the second ignition line 240 of the burner assembly 900 as well as the first ignition line 238 of the burner assembly 900. The third clip 316 receives, holds, and/or retains the third ignition line 242 of the burner assembly 900 as well as the first ignition line 238 and the second ignition line 240 of the burner assembly 900. The fourth clip 318 receives, holds, and/or retains the fourth ignition line 244 of the burner assembly 900 as well as the first ignition line 238, the second ignition line 240, and the third ignition line 242 of the burner assembly 900. The fifth clip 320 receives, holds, and/or retains the fifth ignition line 246 of the burner assembly 900 as well as the first ignition line 238, the second ignition line 240, the third ignition line 242, and the fourth ignition line 244 of the burner assembly 900. In the illustrated example of FIGS. 9-17, each one of the clips receives, holds, and/or retains the above-described ignition line(s) adjacent and/or along the rear surface 402 of the bus bar 202, thereby providing for streamlined and/or simplified wire and/or cable management associated with the ignition lines and/or the bus bar 202 and/or, more generally, associated with the flame sense system 200 of the gas grill 100.

In the illustrated example of FIGS. 9-17, a portion (e.g., a front portion) of each one of the burner tubes of the burner assembly 900 extends through a corresponding one of the burner tube cutouts formed in the bus bar 202 of the burner assembly 900. For example, as shown in FIGS. 9-17, a portion of the first burner tube 204 extends through the first burner tube cutout 332 of the bus bar 202, a portion of the second burner tube 206 extends through the second burner tube cutout 334 of the bus bar 202, a portion of the third burner tube 208 extends through the third burner tube cutout 336 of the bus bar 202, a portion of the fourth burner tube 210 extends through the fourth burner tube cutout 338 of the bus bar 202, and a portion of the fifth burner tube 212 extends through the fifth burner tube cutout 340 of the bus bar 202 such that the corresponding first end 914 (the front end) of each one of the burner tubes is located forward of the front surface 302 of the bus bar 202. As further shown in FIGS. 9-17, at least a first portion (e.g., the bulk of a valve body) of each one of the valves of the burner assembly 900 is located forward of the front surface 302 of the bus bar 202. A second portion (e.g., an outlet conduit or outlet nozzle) of each one of the valves of the burner assembly 900 extends through a corresponding one of the burner tube cutouts or through the IR burner valve cutout 342 formed in the bus bar 202 of the burner assembly 900. For example, as shown in FIGS. 9-17, a portion of the first valve 902 extends through the first burner tube cutout 332 of the bus bar 202, a portion of the second valve 904 extends through the second burner tube cutout 334 of the bus bar 202, a portion of the third valve 906 extends through the third burner tube cutout 336 of the bus bar 202, a portion of the fourth valve 908 extends through the fourth burner tube cutout 338 of the bus bar 202, a portion of the fifth valve 910 extends through the fifth burner tube cutout 340 of the bus bar 202, and a portion of the sixth valve 912 extends through the IR burner valve cutout 342 of the bus bar 202. As further shown in FIGS. 9-17, a portion of an example inlet conduit 920 of the manifold 106 of the burner assembly 900 extends through the inlet conduit cutout 344 formed in the bus bar 202.

Figure 18:
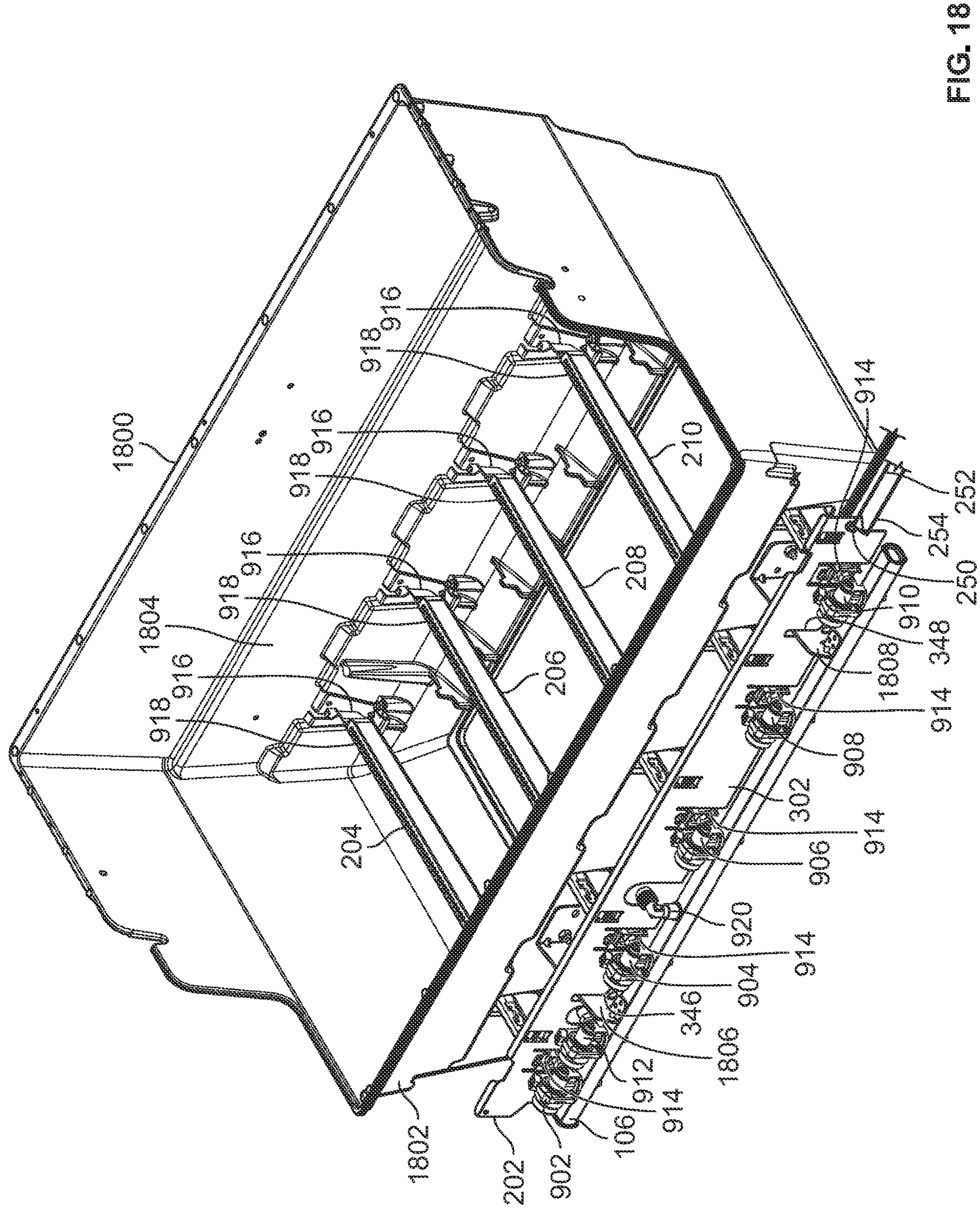
FIG. 18 is a perspective view of the burner assembly as shown in FIGS. 9-17 coupled to an example cookbox.
Figure 19:
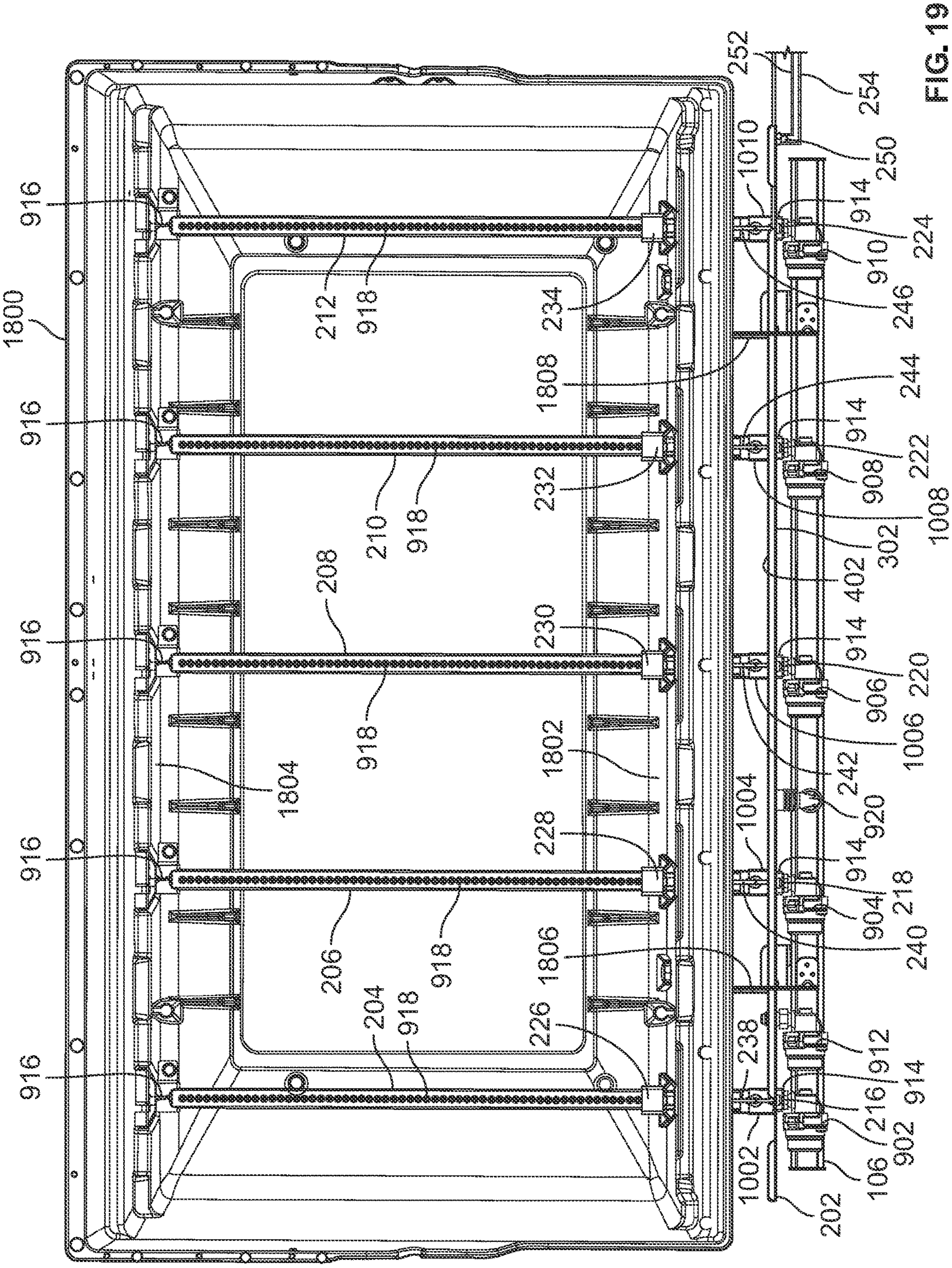
FIG. 19 is a top view of the burner assembly as shown in FIGS. 9-18 coupled to the cookbox as shown in FIG. 18.

FIG. 18 is a perspective view of the burner assembly 900 as shown in FIGS. 9-17 coupled to an example cookbox 1800. FIG. 19 is a top view of the burner assembly 900 as shown in FIGS. 9-18 coupled to the cookbox 1800 as shown in FIG. 18. In the illustrated example of FIGS. 18 and 19, the cookbox 1800 includes an example front wall 1802 and an example rear wall 1804 located opposite the front wall 1802. Each one of the burner tubes (e.g., the first burner tube 204, the second burner tube 206, the third burner tube 208, the fourth burner tube 210, and the fifth burner tube 212) of the burner assembly 900 extends through a corresponding one of a plurality of openings formed in the front wall 1802 of the cookbox 1800 such that the portion of the burner tube including the ports 918 of the burner tube is disposed within the cookbox 1800 (e.g., between the front wall 1802 and the rear wall 1804 of the cookbox 1800). As shown in FIGS. 18 and 19, each one of the burner tubes of the burner assembly 900 is oriented in a front-to-rear direction within the cookbox 1800, with respective ones of the burner tubes being oriented parallel to and being laterally spaced apart from one another within the cookbox 1800.

In the illustrated example of FIGS. 18 and 19, the bus bar 202 of the burner assembly 900 is spaced apart from and located forward of the front wall 1802 of the cookbox 1800. The first end 914 (e.g., the front end) of each one of the burner tubes is located forward of the front surface 302 of the bus bar 202 of the burner assembly 900. At least a portion (e.g., the bulk of a valve body) of each one of the valves of the burner assembly 900 is also located forward of the front surface 302 of the bus bar 202 of the burner assembly 900. The bus bar 202 of the burner assembly 900 advantageously shields the portion of each one of the valves that is located forward of the front surface 302 of the bus bar 202 from heat generated by one or more (e.g., each one) of the burner tubes of the burner assembly 900. In some examples, each one of the valves of the burner assembly 900 is implemented as a controllable electric valve (e.g., a solenoid valve) having an electrical component located forward of the front surface 302 of the bus bar 202. In such examples, the bus bar 202 advantageously shields the electrical component of one or more (e.g., each one) of the valves of the burner assembly 900 from heat generated by one or more (e.g., each one) of the burner tubes of the burner assembly 900.

As shown in FIGS. 18 and 19, the burner assembly 900 is mechanically coupled to the front wall 1802 of the cookbox 1800 via a plurality of cookbox mounting brackets (e.g., an example first cookbox mounting bracket 1806 and an example second cookbox mounting bracket 1808), with each cookbox mounting bracket being mechanically coupled to and extending between a surface of the manifold 106 of the burner assembly 900 and the front wall 1802 of the cookbox 1800. As further shown in FIGS. 18 and 19, a portion of the first cookbox mounting bracket 1806 extends through the first cookbox mounting bracket cutout 346 formed in the bus bar 202 of the burner assembly 900, and a portion of the second cookbox mounting bracket 1808 extends through the second cookbox mounting bracket cutout 348 formed in the bus bar 202 of the burner assembly 900.

Figure 20:
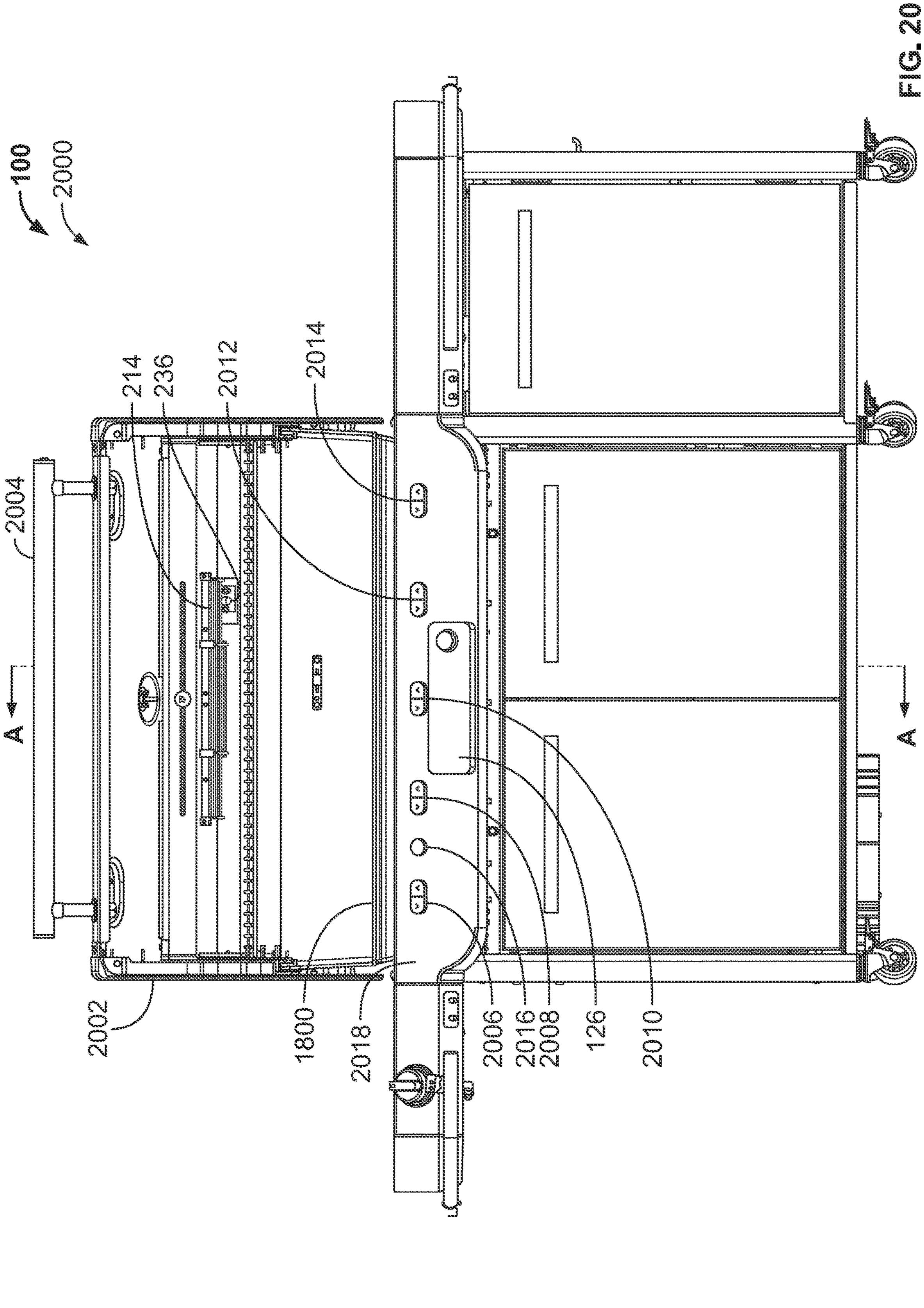
FIG. 20 is a front view of an example implementation of the gas grill of FIG. 1.
Figure 21:
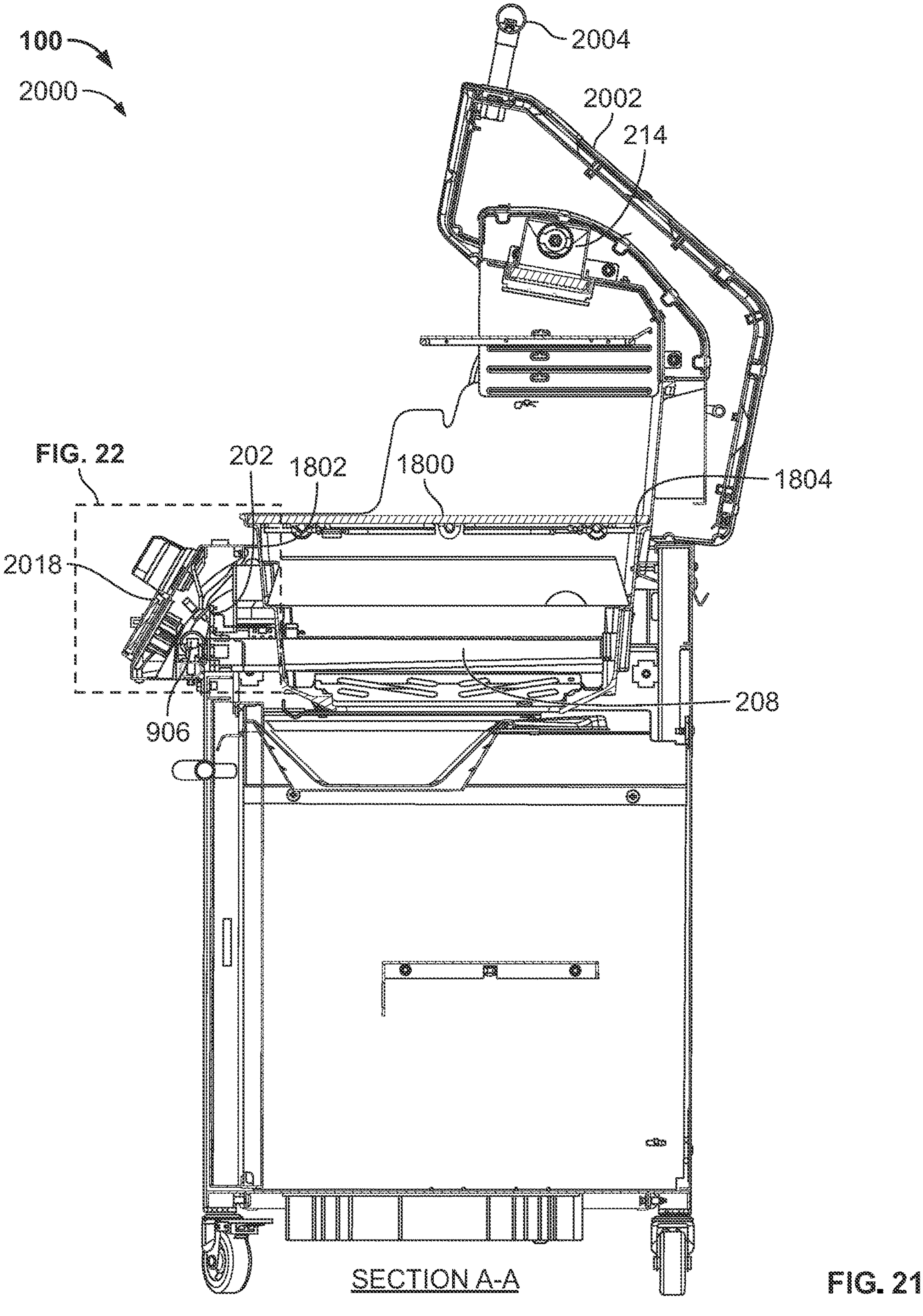
FIG. 21 is a cross-sectional view of the gas grill as shown in FIG. 20, taken along section A-A of FIG. 20.
Figure 22:
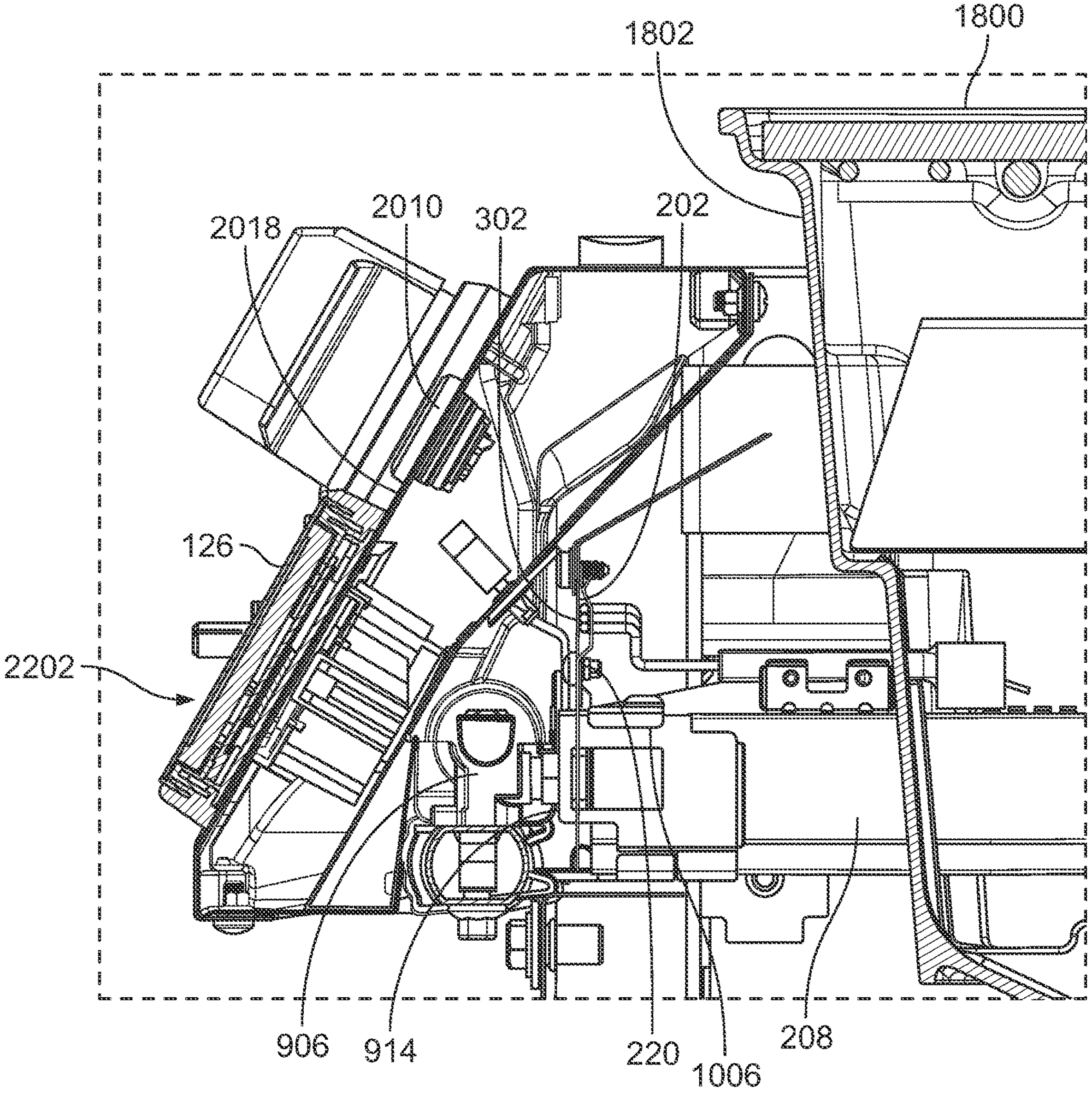
FIG. 22 is an enlarged view of a portion of FIG. 21.

FIG. 20 is a front view of an example implementation of the gas grill 100 of FIG. 1. FIG. 21 is a cross-sectional view of the gas grill 100 as shown in FIG. 20, taken along section A-A of FIG. 20. FIG. 22 is an enlarged view of a portion of FIG. 21. In the illustrated example of FIGS. 20-22, the gas grill 100 includes the bus bar 202 as shown in FIGS. 3-19, the burner assembly 900 as shown in FIGS. 9-19, and the cookbox 1800 as shown in FIGS. 18 and 19. The IR burner 214 of the burner assembly 900 can be seen in FIGS. 20 and 21, with the IR burner 214 being implemented as a downwardly-facing IR burner located above respective ones of the burner tubes of the burner assembly 900 of the gas grill 100, and with the IR burner 214 including one or more ceramic tile(s) oriented downwardly toward the burner tubes.

As shown in FIGS. 20-22, the gas grill 100 includes an example lid 2002 shown in an example open position 2000 relative to the cookbox 1800 of the gas grill 100. The lid 2002 is movably (e.g., pivotally) coupled to the cookbox 1800 such that the lid 2002 can be moved (e.g., pivoted) relative to the cookbox 1800 between the open position 2000 shown in FIGS. 20-22 and a closed position in which the lid covers and/or conceals a portion of the cookbox 1800. Movement of the lid 2002 of the gas grill 100 between the open position 2000 shown in FIGS. 20-22 and the closed position can be facilitated via user interaction with an example handle 2004 of the gas grill 100 that is coupled to the lid 2002.

In the illustrated example of FIGS. 20-22, each one of the valves (e.g., the first valve 902, the second valve 904, the third valve 906, the fourth valve 908, the fifth valve 910, and the sixth valve 912) of the burner assembly 900 is implemented as a controllable electric valve (e.g., a solenoid valve), with the controllable electric valve having a flow control member configured to be electrically adjusted in response to instructions, commands, and/or signals (e.g., a supply of current) generated by the controller 136 of the gas grill 100. User inputs pertaining to such instructions, commands, and/or signals can be received via at corresponding ones of a plurality of control buttons (e.g., an example first control button 2006, an example second control button 2008, an example third control button 2010, an example fourth control button 2012, an example fifth control button 2014, and an example sixth control button 2016) located on an example control panel 2018 of the gas grill 100, wherein each one of the control buttons is operatively coupled (e.g., via a wired or wireless electrical connection) to a controller (e.g., the controller 136 of FIG. 1) of the gas grill 100, and the controller is operatively coupled (e.g., via a wired or wireless electrical connection) to corresponding ones of the controllable electric valves. For example, the first control button 2006 located on the control panel 2018 of the gas grill 100 of FIGS. 20-22 is operatively coupled to the controller 136 of the gas grill 100, and the controller 136 is operatively coupled to the first valve 902 of the gas grill 100, thereby facilitating a control-by-wire architecture between the first control button 2006 and the first valve 902. As another example, the second control button 2008 located on the control panel 2018 of the gas grill 100 of FIGS. 20-22 is operatively coupled to the controller 136 of the gas grill 100, and the controller 136 is operatively coupled to the second valve 904 of the gas grill 100, thereby facilitating a control-by-wire architecture between the second control button 2008 and the second valve 904.

As shown in FIGS. 21 and 22, at least a portion (e.g., the bulk of a valve body) of each one of the valves of the burner assembly 900 is located forward of the front surface 302 of the bus bar 202 of the burner assembly 900. The bus bar 202 of the burner assembly 900 advantageously shields the portion of each one of the valves that is located forward of the front surface 302 of the bus bar 202 from heat generated by one or more (e.g., each one) of the burner tubes of the burner assembly 900. In some examples, the portion of one or more (e.g., each one) of the valves that is located forward of the front surface 302 of the bus bar 202 includes an electrical component. In such examples, the bus bar 202 advantageously shields the electrical component of the one or more (e.g., each one) of the valves of the burner assembly 900 from heat generated by one or more (e.g., each one) of the burner tubes of the burner assembly 900.

As further shown in FIGS. 21 and 22, an example implementation of the user interface 126 of the gas grill 100 is located on the control panel 2018 of the gas grill 100. The user interface 126 includes one or more example electrical component(s) 2202 located forward of the front surface 302 of the bus bar 202. The bus bar 202 advantageously shields the electrical component(s) 2202 of the user interface 126 from heat generated by one or more (e.g., each one) of the burner tubes of the burner assembly 900. The bus bar 202 also advantageously shields other electrical components (e.g., the first control button 2006, the second control button 2008, the third control button 2010, the fourth control button 2012, the fifth control button 2014, and/or the sixth control button 2016) located on the control panel 2018 from heat generated by one or more (e.g., each one) of the burner tubes of the burner assembly 900.

The following paragraphs provide various examples in relation to the disclosed gas grills including bus bars.

Example 1 includes a gas grill. In Example 1, the gas grill includes flame sense circuitry, a bus bar, a first burner tube, and a second burner tube. The bus bar is electrically connected to a return line of the flame sense circuitry. The first burner tube is coupled to the bus bar. The first burner tube is electrically connected to the return line via the bus bar. The flame sense circuitry is configured to detect a presence of a flame at the first burner tube. The second burner tube is spaced apart from the first burner tube and coupled to the bus bar. The second burner tube is electrically connected to the return line via the bus bar. The flame sense circuitry is configured to detect a presence of a flame at the second burner tube. The bus bar electrically connects the first burner tube and the second burner tube to the return line in parallel.

Example 2 includes the gas grill of Example 1. In Example 2, the gas grill further includes a return line fastener coupled to the bus bar. The return line fastener mechanically secures the electrical connection between the bus bar and the return line.

Example 3 includes the gas grill of Example 1. In Example 3, the return line is grounded.

Example 4 includes the gas grill of Example 1. In Example 4, the gas grill further includes a first mounting bracket and a second mounting bracket. The first mounting bracket is coupled to the first burner tube and extends between the first burner tube and the bus bar. The first burner tube is coupled to and electrically connected to the bus bar via the first mounting bracket. The second mounting bracket is coupled to the second burner tube and extends between the second burner tube and the bus bar. The second burner tube is coupled to and electrically connected to the bus bar via the second mounting bracket.

Example 5 includes the gas grill of Example 4. In Example 5, the gas grill further includes a first fastener and a second fastener. The first fastener engages the first mounting bracket and the bus bar. The first mounting bracket is coupled to and electrically connected to the bus bar via the first fastener. The second fastener engages the second mounting bracket and the bus bar. The second mounting bracket is coupled to and electrically connected to the bus bar via the second fastener.

Example 6 includes the gas grill of Example 5. In Example 6, the gas grill further includes a third burner tube, a third mounting bracket, and a third fastener. The third burner tube is spaced apart from the first burner tube and the second burner tube. The third burner tube is coupled to the bus bar. The third burner tube is electrically connected to the return line via the bus bar. The flame sense circuitry is configured to detect a presence of a flame at the third burner tube. The bus bar electrically connects the first burner tube, the second burner tube, and the third burner tube to the return line in parallel. The third mounting bracket is coupled to the third burner tube and extends between the third burner tube and the bus bar. The third burner tube is coupled to and electrically connected to the bus bar via the third mounting bracket. The third fastener engages the third mounting bracket and the bus bar. The third mounting bracket is coupled to and electrically connected to the bus bar via the third fastener.

Example 7 includes the gas grill of Example 1. In Example 7, the gas grill further includes ignition circuitry, a first ignitor, and a second ignitor. The ignition circuitry includes a first ignition line and a second ignition line. The first ignitor is electrically connected to the ignition circuitry via the first ignition line. The first ignitor is operatively positioned proximate the first burner tube. The ignition circuitry is configured to cause the first ignitor to generate a spark to ignite a flow of gas passing through the first burner tube. The second ignitor is electrically connected to the ignition circuitry via the second ignition line. The second ignitor is operatively positioned proximate the second burner tube. The ignition circuitry is configured to cause the second ignitor to generate a spark to ignite a flow of gas passing through the second burner tube.

Example 8 includes the gas grill of Example 7. In Example 8, the flame sense circuitry is electrically connected to the first ignition line and the second ignition line.

Example 9 includes the gas grill of Example 8. In Example 9, the gas grill further includes an ignition module. The ignition module includes the ignition circuitry and the flame sense circuitry.

Example 10 includes the gas grill of Example 7. In Example 10, the bus bar includes a clip integrally formed by the bus bar. The clip is configured to receive a portion of at least one of the first ignition line or the second ignition line.

Example 11 includes the gas grill of Example 10. In Example 11, the clip projects rearwardly from a rear surface of the bus bar. The clip is configured to retain the at least one of the first ignition line or the second ignition line adjacent the rear surface of the bus bar.

Example 12 includes the gas grill of Example 1. In Example 12, the bus bar includes a first cutout and a second cutout. The first cutout is formed in and extends through the bus bar. The first burner tube extends through the bus bar via the first cutout such that a front end of the first burner tube is located forward of a front surface of the bus bar. The second cutout is located separately from the first cutout. The second cutout is formed in and extends through the bus bar. The second burner tube extends through the bus bar via the second cutout such that a front end of the second burner tube is located forward of the front surface of the bus bar.

Example 13 includes the gas grill of Example 1. In Example 13, the gas grill further includes a manifold, a first valve, and a second valve. The first valve is operatively positioned between the manifold and the first burner tube. The bus bar is configured to shield a portion of the first valve located forward of a front surface of the bus bar from heat generated by the first burner tube. The second valve is operatively positioned between the manifold and the second burner tube. The bus bar is configured to shield a portion of the second valve located forward of the front surface of the bus bar from heat generated by the second burner tube.

Example 14 includes the gas grill of Example 13. In Example 14, the first valve is a first controllable electric valve having an electrical component located forward of the front surface of the bus bar. The bus bar is configured to shield the electrical component of the first controllable electric valve from heat generated by the first burner tube. In Example 14, the second valve is a second controllable electric valve having an electrical component located forward of the front surface of the bus bar. The bus bar is configured to shield the electrical component of the second controllable electric valve from heat generated by the second burner tube.

Example 15 includes the gas grill of Example 1. In Example 15, the gas grill further includes a control panel located forward of a front surface of the bus bar. The bus bar is configured to shield one or more components carried by the control panel from heat generated by at least one of the first burner tube or the second burner tube.

Example 16 includes the gas grill of Example 1. In Example 16, the gas grill further includes an infrared (IR) burner spaced apart from the first burner tube and the second burner tube. The IR burner includes one or more ceramic tiles.

Example 17 includes the gas grill of Example 16. In Example 17, the return line is a first return line. The IR burner is electrically connected to the bus bar via a second return line extending between the IR burner and the bus bar. The second return line is electrically connected to the first return line.

Example 18 includes the gas grill of Example 17. In Example 18, the flame sense circuitry is configured to detect a presence of a flame at the IR burner.

Example 19 includes the gas grill of Example 18. In Example 19, the gas grill further includes ignition circuitry and an ignitor. The ignition circuitry includes an ignition line. The ignitor is electrically connected to the ignition circuitry via the ignition line. The ignitor is operatively positioned proximate the IR burner. The ignition circuitry is configured to cause the ignitor to generate a spark to ignite a flow of gas passing through at least one of the one or more ceramic tiles of the IR burner.

Example 20 includes the gas grill of Example 19. In Example 20, the flame sense circuitry is electrically connected to the ignition line.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A gas grill, comprising:

flame sense circuitry;

a bus bar electrically connected to a return line of the flame sense circuitry;

a first burner tube coupled to the bus bar, the first burner tube electrically connected to the return line via the bus bar, the flame sense circuitry configured to detect a presence of a flame at the first burner tube;

a second burner tube spaced apart from the first burner tube and coupled to the bus bar, the second burner tube electrically connected to the return line via the bus bar, the flame sense circuitry configured to detect a presence of a flame at the second burner tube, the bus bar electrically connecting the first burner tube and the second burner tube to the return line in parallel;

a first mounting bracket coupled to the first burner tube and extending between the first burner tube and the bus bar, the first burner tube coupled to and electrically connected to the bus bar via the first mounting bracket; and a second mounting bracket coupled to the second burner tube and extending between the second burner tube and the bus bar, the second burner tube coupled to and electrically connected to the bus bar via the second mounting bracket.

2. The gas grill of claim 1, further comprising a return line fastener coupled to the bus bar, the return line fastener mechanically securing the electrical connection between the bus bar and the return line.

3. The gas grill of claim 1, wherein the return line is grounded.

4. The gas grill of claim 1, further comprising:

a first fastener engaging the first mounting bracket and the bus bar, the first mounting bracket coupled to and electrically connected to the bus bar via the first fastener; and a second fastener engaging the second mounting bracket and the bus bar, the second mounting bracket coupled to and electrically connected to the bus bar via the second fastener.

5. The gas grill of claim 4, further comprising:

a third burner tube spaced apart from the first burner tube and the second burner tube, the third burner tube coupled to the bus bar, the third burner tube electrically connected to the return line via the bus bar, the flame sense circuitry configured to detect a presence of a flame at the third burner tube, the bus bar electrically connecting the first burner tube, the second burner tube, and the third burner tube to the return line in parallel;

a third mounting bracket coupled to the third burner tube and extending between the third burner tube and the bus bar, the third burner tube coupled to and electrically connected to the bus bar via the third mounting bracket; and a third fastener engaging the third mounting bracket and the bus bar, the third mounting bracket coupled to and electrically connected to the bus bar via the third fastener.

6. The gas grill of claim 1, further comprising:

ignition circuitry including a first ignition line and a second ignition line;

a first ignitor electrically connected to the ignition circuitry via the first ignition line, the first ignitor operatively positioned proximate the first burner tube, the ignition circuitry configured to cause the first ignitor to generate a spark to ignite a flow of gas passing through the first burner tube; and a second ignitor electrically connected to the ignition circuitry via the second ignition line, the second ignitor operatively positioned proximate the second burner tube, the ignition circuitry configured to cause the second ignitor to generate a spark to ignite a flow of gas passing through the second burner tube.

7. The gas grill of claim 6, wherein the flame sense circuitry is electrically connected to the first ignition line and the second ignition line.

8. The gas grill of claim 7, further comprising an ignition module including the ignition circuitry and the flame sense circuitry.

9. The gas grill of claim 6, wherein the bus bar includes a clip integrally formed by the bus bar, the clip configured to receive a portion of at least one of the first ignition line or the second ignition line.

10. The gas grill of claim 9, wherein the clip projects rearwardly from a rear surface of the bus bar, the clip configured to retain the at least one of the first ignition line or the second ignition line adjacent the rear surface of the bus bar.

11. The gas grill of claim 1, wherein the bus bar includes:

a first cutout formed in and extending through the bus bar, the first burner tube extending through the bus bar via the first cutout such that a front end of the first burner tube is located forward of a front surface of the bus bar; and a second cutout located separately from the first cutout, the second cutout formed in and extending through the bus bar, the second burner tube extending through the bus bar via the second cutout such that a front end of the second burner tube is located forward of the front surface of the bus bar.

12. The gas grill of claim 1, further comprising:

a manifold;

a first valve operatively positioned between the manifold and the first burner tube, the bus bar configured to shield a portion of the first valve located forward of a front surface of the bus bar from heat generated by the first burner tube; and a second valve operatively positioned between the manifold and the second burner tube, the bus bar configured to shield a portion of the second valve located forward of the front surface of the bus bar from heat generated by the second burner tube.

13. The gas grill of claim 12, wherein the first valve is a first controllable electric valve having an electrical component located forward of the front surface of the bus bar, the bus bar configured to shield the electrical component of the first controllable electric valve from heat generated by the first burner tube, and wherein the second valve is a second controllable electric valve having an electrical component located forward of the front surface of the bus bar, the bus bar configured to shield the electrical component of the second controllable electric valve from heat generated by the second burner tube.

14. The gas grill of claim 1, further comprising a control panel located forward of a front surface of the bus bar, the bus bar configured to shield one or more components carried by the control panel from heat generated by at least one of the first burner tube or the second burner tube.

15. A gas grill, comprising:

flame sense circuitry;

a bus bar electrically connected to a first return line of the flame sense circuitry;

a first burner tube coupled to the bus bar, the first burner tube electrically connected to the first return line via the bus bar, the flame sense circuitry configured to detect a presence of a flame at the first burner tube;

a second burner tube spaced apart from the first burner tube and coupled to the bus bar, the second burner tube electrically connected to the first return line via the bus bar, the flame sense circuitry configured to detect a presence of a flame at the second burner tube, the bus bar electrically connecting the first burner tube and the second burner tube to the first return line in parallel; and an infrared (IR) burner spaced apart from the first burner tube and the second burner tube, the IR burner including one or more ceramic tiles, wherein the IR burner is electrically connected to the bus bar via a second return line extending between the IR burner and the bus bar, wherein the second return line is electrically connected to the first return line.

16. The gas grill of claim 15, wherein the flame sense circuitry is configured to detect a presence of a flame at the IR burner.

17. The gas grill of claim 16, further comprising:

ignition circuitry including an ignition line; and an ignitor electrically connected to the ignition circuitry via the ignition line, the ignitor operatively positioned proximate the IR burner, the ignition circuitry configured to cause the ignitor to generate a spark to ignite a flow of gas passing through at least one of the one or more ceramic tiles of the IR burner.

18. The gas grill of claim 17, wherein the flame sense circuitry is electrically connected to the ignition line.

19. A gas grill, comprising:

flame sense circuitry;

a bus bar electrically connected to a return line of the flame sense circuitry, the bus bar including:

a first cutout formed in and extending through the bus bar; and a second cutout located separately from the first cutout, the second cutout formed in and extending through the bus bar;

a first burner tube coupled to the bus bar, the first burner tube extending through the bus bar via the first cutout such that a front end of the first burner tube is located forward of a front surface of the bus bar, the first burner tube electrically connected to the return line via the bus bar, the flame sense circuitry configured to detect a presence of a flame at the first burner tube; and a second burner tube spaced apart from the first burner tube and coupled to the bus bar, the second burner tube extending through the bus bar via the second cutout such that a front end of the second burner tube is located forward of the front surface of the bus bar, the second burner tube electrically connected to the return line via the bus bar, the flame sense circuitry configured to detect a presence of a flame at the second burner tube, the bus bar electrically connecting the first burner tube and the second burner tube to the return line in parallel.

20. A gas grill, comprising:

flame sense circuitry;

a bus bar electrically connected to a return line of the flame sense circuitry;

a first burner tube coupled to the bus bar, the first burner tube electrically connected to the return line via the bus bar, the flame sense circuitry configured to detect a presence of a flame at the first burner tube;

a second burner tube spaced apart from the first burner tube and coupled to the bus bar, the second burner tube electrically connected to the return line via the bus bar, the flame sense circuitry configured to detect a presence of a flame at the second burner tube, the bus bar electrically connecting the first burner tube and the second burner tube to the return line in parallel;

a manifold;

a first controllable electric valve operatively positioned between the manifold and the first burner tube, the bus bar configured to shield an electrical component of the first controllable electric valve located forward of a front surface of the bus bar from heat generated by the first burner tube; and a second controllable electric valve operatively positioned between the manifold and the second burner tube, the bus bar configured to shield an electrical component of the second controllable electric valve located forward of the front surface of the bus bar from heat generated by the second burner tube.

* * * * *